United States Patent
Sun et al.

(10) Patent No.: US 11,432,297 B2
(45) Date of Patent: Aug. 30, 2022

(54) METHOD FOR IMPROVING SERVICE RELIABILITY, DEVICE, AND SYSTEM

(71) Applicant: Huawei Technologies Co., Ltd., Shenzhen (CN)

(72) Inventors: Dekui Sun, Shenzhen (CN); Han Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 16/862,001

(22) Filed: Apr. 29, 2020

(65) Prior Publication Data
US 2020/0260457 A1    Aug. 13, 2020

Related U.S. Application Data

(63) Continuation of application No. PCT/CN2017/108396, filed on Oct. 30, 2017.

(51) Int. Cl.
*H04W 72/08* (2009.01)
*H04L 47/80* (2022.01)
*H04L 12/18* (2006.01)

(52) U.S. Cl.
CPC ............ *H04W 72/08* (2013.01); *H04L 12/18* (2013.01); *H04L 12/1845* (2013.01); *H04L 47/806* (2013.01)

(58) Field of Classification Search
CPC ..... H04W 72/02; H04W 72/04; H04W 72/08; H04W 72/082–087; H04W 36/0069; H04L 12/18; H04L 12/1845; H04L 47/806
See application file for complete search history.

(56) References Cited

U.S. PATENT DOCUMENTS

| 8,126,467 B2 * | 2/2012 | Choi | H04W 36/18 370/332 |
| 2002/0101841 A1 * | 8/2002 | Kilgore | H04W 36/0011 370/331 |

(Continued)

FOREIGN PATENT DOCUMENTS

| CN | 101589594 A | 11/2009 |
| CN | 105517028 A | 4/2016 |

(Continued)

OTHER PUBLICATIONS

3GPP TS 38.401 V0.4.0, "3rd Generation Partnership Project; Technical Specification Group Radio Access Network; NG-RAN; Architecture description (Release 15)," Oct. 2017, 30 pages.
(Continued)

*Primary Examiner* — Warner Wong
(74) *Attorney, Agent, or Firm* — Conley Rose, P.C.

(57) ABSTRACT

A method for improving service reliability includes deciding, by a session function entity in a network, to initiate establishment of at least two transmission paths between a terminal and the user plane function entity, and instructing the terminal or the user plane function entity to transmit same data on the at least two paths. The user plane function allocates, based on a notification of the session function entity, user plane resources to the at least two transmission paths, and transmits the same data with the terminal on the at least two transmission paths. A core network initiates the establishment of the at least two transmission paths to the terminal. Two access devices may independently establish the at least two transmission paths.

16 Claims, 15 Drawing Sheets

(56) References Cited

U.S. PATENT DOCUMENTS

| | | | |
|---|---|---|---|
| 2006/0142008 A1* | 6/2006 | Lee | H04W 36/02 455/436 |
| 2011/0170453 A1 | 7/2011 | Babbar | |
| 2013/0176988 A1* | 7/2013 | Wang | H04B 7/15592 370/331 |
| 2014/0010207 A1* | 1/2014 | Horn | H04W 36/165 370/332 |
| 2014/0064210 A1 | 3/2014 | Anchan et al. | |
| 2014/0335882 A1* | 11/2014 | Lee | H04W 76/15 455/452.2 |
| 2015/0085638 A1* | 3/2015 | Li | H04L 45/50 370/217 |
| 2016/0135174 A1 | 5/2016 | Lee et al. | |
| 2016/0381665 A1* | 12/2016 | Callard | H04L 47/32 370/329 |
| 2017/0288972 A1 | 10/2017 | Li et al. | |
| 2017/0289265 A1 | 10/2017 | Faccin et al. | |
| 2018/0199315 A1* | 7/2018 | Hong | H04L 1/1867 |
| 2018/0310350 A1* | 10/2018 | Stojanovski | H04L 61/1511 |
| 2019/0037443 A1* | 1/2019 | Lee | H04L 47/34 |
| 2019/0045398 A1 | 2/2019 | Chai | |
| 2019/0053325 A1* | 2/2019 | Yu | H04W 76/32 |
| 2019/0357075 A1* | 11/2019 | Van Der Velde | H04W 76/15 |
| 2020/0059821 A1* | 2/2020 | Wirth | H04W 28/04 |
| 2020/0084815 A1* | 3/2020 | Rinne | H04W 76/11 |
| 2020/0187282 A1* | 6/2020 | Yu | H04L 5/0055 |
| 2020/0195548 A1* | 6/2020 | Luo | H04W 52/386 |
| 2020/0205208 A1* | 6/2020 | Hu | H04W 76/11 |
| 2020/0280827 A1* | 9/2020 | Fechtel | H04W 4/80 |
| 2020/0358558 A1* | 11/2020 | Tang | H04L 5/001 |

FOREIGN PATENT DOCUMENTS

| | | |
|---|---|---|
| CN | 106559806 A | 4/2017 |
| CN | 107027144 A | 8/2017 |
| CN | 107040942 A | 8/2017 |
| JP | 2003111134 A | 4/2003 |
| JP | 2019512981 A | 5/2019 |
| KR | 20120031090 A | 3/2012 |
| KR | 20150052150 A | 5/2015 |
| WO | 2009078675 A1 | 6/2009 |
| WO | 2017166300 A1 | 10/2017 |
| WO | 2019030981 A1 | 2/2019 |

OTHER PUBLICATIONS

Zte et al., "NGAP Impacts due to PDU Session Split over NG-U," 3GPP TSG RAN WG3#97, R3-172682, Berlin, Germany, Aug. 21-25, 2017, 14 pages.

3GPP TS 23.502, V1.2.0, "3rd Generation Partnership Project; Technical Specification Group Services and System Aspects; Procedures for the 5G System; Stage 2 (Release 15)," Sep. 2017, 165 pages.

3GPP TS 23.501, V1.4.0, "3rd Generation Partnership Project; Technical Specification Group Services and System Aspects; System Architecture for the 5G System; Stage 2 (Release 15)," Sep. 2017, 151 pages.

3GPP TS 37.340, V1.0.2, "3rd Generation Partnership Project; Technical Specification Group Radio Access Network Evolved Universal Terrestrial Radio Access (E-UTRA) and NR; Multi-connectivity; Stage 2 (Release 15)," Sep. 2017, 44 pages.

Xiandong, L., "Research on Dual Connectivity in LTE-Advanced System," Beijing University of Posts and Telecommunications, Jan. 5, 2015, with an English abstract, 72 pages.

Gebert, J., et al., "Fat Pipes for User Plane Tunneling in 5G," 2016 IEEE Conference on Standards for Communications and Networking (CSCN), 6 pages.

Nortel et al., "Multi-media sessions using PS and CS media," 3GPP TSG SA WG2 Meeting #63 TD, S2-081393, Athens, Greece, Feb. 18-22, 2008, 5 pages.

Ericsson, "MN and SN rale for QoS flow to DRB mapping[online]," 3GPP TSG RAN WG3 #97bis R3-173952, Oct. 9-13, 2017, 14 pages.

* cited by examiner

METHOD FOR IMPROVING SERVICE RELIABILITY, DEVICE, AND SYSTEM

CROSS-REFERENCE TO RELATED APPLICATIONS

This application is a continuation of International Patent Application No. PCT/CN2017/108396, filed on Oct. 30, 2017, the disclosure of which is hereby incorporated by reference in its entirety.

TECHNICAL FIELD

This application relates to the field of communications technologies, and in particular, to a method for improving service reliability, a device, and a system.

BACKGROUND

To address challenges from wireless broadband technologies and ensure leading positions of 3rd Generation Partnership Project (3GPP) networks, by the end of 2016, the 3GPP standard organization formulated a network architecture of a next generation mobile communications system (i.e., next generation system), which is referred to as a 5th generation (5G) network architecture.

In the 5G network architecture, an ultra-reliable low-latency communications (URLLC) scenario is defined, and mainly includes services such as unmanned driving and industrial automation that require low-latency and high-reliability connections. An advanced air interface technology and an optimized core network architecture of a 5G network make it possible to meet requirements of the scenario. However, a bottom-layer link, an upper-layer routing protocol, and the like in a mobile network each have some instability, and services in the foregoing scenario are mostly related to life safety or production safety. Therefore, No error is allowed. In this case, an optimized network solution needs to be provided, so that the network can still meet the requirements as much as possible even if link quality is poor.

SUMMARY

To meet a requirement for a high-reliability application, this application provides a network for improving service reliability. The network includes a session function entity and a user plane function entity. The session function entity is configured to decide to initiate establishment of at least two transmission paths between a terminal and the user plane function entity, and instruct the terminal or the user plane function entity to transmit same data on the at least two paths. The user plane function entity is configured to, based on a notification of the session function entity, allocate user plane resources to the at least two transmission paths, and transmit the same data to the terminal on the at least two transmission paths. The network initiates the establishment of the at least two transmission paths to the terminal, so that reliability of data transmission of a high-reliability service is well ensured.

There are a plurality of cases in which the network is triggered to determine to establish a plurality of transmission paths, including the session function entity obtains quality of service (QoS) information of a service based on a service request sent by the terminal or a policy function entity, and determines, based on the QoS information, that the first transmission path and the second transmission path that are between the terminal and the user plane function entity need to be established; or the session function entity requests authorization from a policy function entity based on a master and secondary transmission path establishment indication or a bi-casting indication carried in a service request sent by the terminal, and determines, based on a result of the authorization result, that a first transmission path and a second transmission path that are between the terminal and the user plane function entity need to be established.

That the session function entity instructs the terminal or the user plane function entity to transmit the same data on the first transmission path and the second transmission path includes sending, by the session function entity, an association identifier (or referred to as a backup identifier) to the terminal or the user plane function entity. The association identifier instructs the terminal or the user plane function entity to transmit the same data on the first transmission path and the second transmission path.

Establishment of the plurality of transmission paths and instructing the terminal and the user plane function entity to start to transmit data on the plurality of established transmission paths may be completed in sequence, or may be simultaneously completed. For example, while the session function entity initiates establishment of the first transmission path and the second transmission path, the session function entity may instruct the user plane function entity and/or the terminal to start to transmit the same data on the established first transmission path and second transmission path; or after establishment of the first transmission path and the second transmission path is completed, the session function entity may instruct, based on a network status or a service requirement, the user plane function entity and/or the terminal to start to transmit the same data on the first transmission path and the second transmission path. Such processing manner can improve flexibility of using a plurality of transmission paths.

There may be a plurality of manners in which the plurality of transmission paths are established in the network. In one manner, the plurality of transmission paths may be separately established. Access devices that bear the transmission paths may be not associated with each other. In other words, the session function entity instructs the mobility management entity to instruct a first access device and a second access device to negotiate with the terminal to establish the first transmission path and the second transmission path respectively. In another manner, the session function entity may initiate the establishment of the plurality of transmission paths by using one access device (for example, a first access device is used as an anchor). For example, the session function entity sends the first and second transmission path establishment request to a mobility management entity. Based on an indication of the session function entity, the mobility management entity instructs the first access device to establish the first transmission path, and instructs the first access device to instruct a second access device to establish the second transmission path. For example, the first access device may obtain resource information of the second access device, and then notify the terminal; the terminal may initiate establishment of a connection to the second access device, to complete establishment of the second transmission path.

That the terminal or the user plane function entity transmits the same data on the first transmission path and the second transmission path includes sending, by the user plane function entity or the terminal, the same data on the first transmission path and the second transmission path; or receiving, by the user plane function entity or the terminal, the same data on the first transmission path and the second transmission path, and deduplicating the received data. In addition, on a receiving side, the terminal or the user plane function entity may alternatively select, based on data transmission quality and/or link quality, one of the two established transmission paths to receive the data, and does not need to perform a deduplication operation. Although an operation of path quality detection is added, burden of data deduplication can be reduced.

In a 5G network, the session function entity is a session management function (SMF) entity, and the user plane function entity (UPF); in a 4G network, the session function entity is a packet data gateway (PGW), and the user plane function entity is a gateway user plane function (GW-U).

The network provided in this application may further be applied in a case in which establishment of the second transmission path is initiated when there is already the first transmission path between the terminal and the user plane function entity. In this case, the session function entity determines to establish the second transmission path between the terminal and the user plane function entity. The session function entity initiates the establishment of the second transmission path, and may instruct, by using a second transmission path establishment request, the terminal or the user plane function entity to transmit the same data on the first transmission path and the second transmission path.

A manner in which the session function entity determines that the second transmission path between the terminal and the user plane function entity needs to be established includes receiving, by the session function entity, a request message sent by the terminal or the policy function entity, and determining, based on the request message, that the second transmission path between the terminal and the user plane function entity needs to be established. The manner may further include receiving, by the session function entity, a notification message (such as a fault notification message) that is about the first transmission path and that is sent by the user plane function entity, and determining that the second transmission path needs to be established. A case in which the second transmission path is established when there is already the first transmission path is similar to a case in which the second transmission path is established when a connection is initiated. Details are not described herein.

Correspondingly, this application also provides a method for improving service reliability. A procedure for implementing the method is basically consistent with the procedure of the network system, described above. Details are not described again.

This application further provides a terminal apparatus. The apparatus may be a terminal or a chip in a terminal. The apparatus has functions of implementing the foregoing embodiments. The functions may be implemented by hardware, or may be implemented by hardware executing corresponding software. The hardware or the software includes one or more modules corresponding to the functions. In a possible design, when the apparatus is a terminal, the terminal includes an interaction module and a processing module. The interaction module is configured to receive a message sent by a session function entity. The message is used to instruct the processing module to transmit same data on a first transmission path and a second transmission path that are between a user plane function entity and the terminal. The processing module is configured to transmit the same data on the first transmission path and the second transmission path.

This application further provides a session function entity, for example, an SW, including a decision module and a processing module. The decision module is configured to determine to establish a first transmission path and a second transmission path that are between a terminal and a user plane function entity, or when there is already a first transmission path, determine to establish a second transmission path. The processing module is configured to initiate establishment of the first transmission path and the second transmission path, or initiate establishment of the second transmission path when there is already the first transmission path. The processing module is further configured to instruct the terminal or the user plane function entity to transmit same data on the first transmission path and the second transmission path.

For more detailed functions of the function units of the foregoing terminal and session function entity, refer to descriptions in the method and system embodiments. Details are not described herein. A person skilled in the art can flexibly implement specific functions of the function units based on the descriptions of the method and system provided in the embodiments of the present disclosure.

This application further provides a computer program product. When the computer product is executed, the computer program product is used to perform methods performed by the terminal and the network that are described above.

This application further provides a computer readable storage medium. The computer readable storage medium stores an instruction, and the instruction is used to perform methods performed by the terminal and the network that are described above.

DESCRIPTION OF EMBODIMENTS

The following describes technical solutions in the embodiments of this application with reference to the accompanying drawings in the embodiments of this application. In description of this application, "I" means "or" unless otherwise specified. For example, A/B may represent A or B. In this specification, "and/or" describes only an association relationship for describing associated objects and represents that three relationships may exist. For example, A and/or B may represent the following three cases, only A exists, both A and B exist, and only B exists. In addition, in the descriptions of this application, the term "a plurality of" means two or more than two unless otherwise specified. In addition, to clearly describe the technical solutions in the embodiments of this application, terms such as "first" and "second" are used in the embodiments of this application to distinguish between same items or similar items that have a basically same function and purpose. A person skilled in the art may understand that the terms such as "first" and "second" are not intended to limit a quantity or an execution sequence, and that the terms such as "first" and "second" do not indicate a definite difference.

Figure 1:
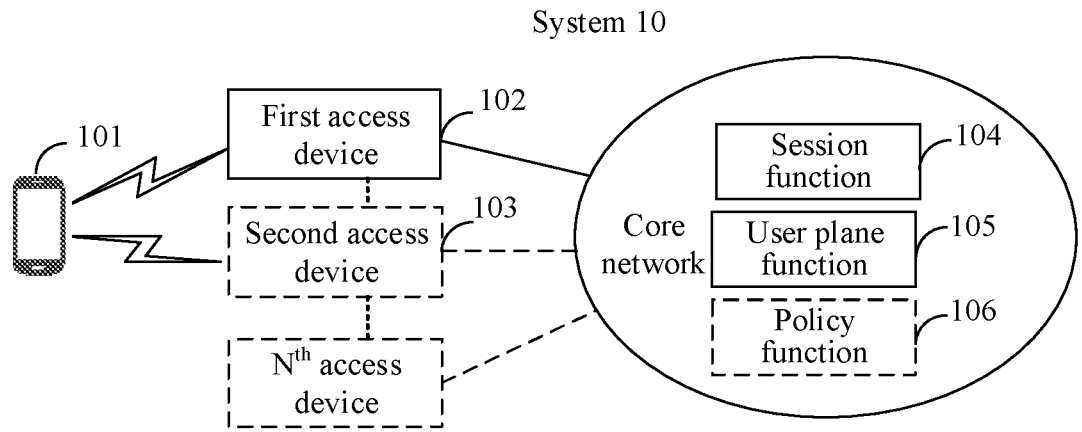
FIG. 1 is a schematic architectural diagram of a system 10 for improving service reliability according to an embodiment of the present disclosure.

FIG. 1 is a schematic architectural diagram of a system 10 for improving service reliability according to an embodiment of the present disclosure. The system 10 for improving service reliability includes a terminal 101, a first access device 102, and a second access device 103, or more access devices. The system 10 for improving service reliability further includes function network elements in a core network, which include a session function entity 104 and a user plane function entity 105, and may further include a policy function entity 106. The user terminal 101 accesses the core network by using the first access device 102 and/or the second access device 103, and performs service data transmission with the core network. The first access device 102 and the second access device 103 are both connected to the core network. The core network establishes transmission paths to the terminal 101 by using the access devices.

The terminal 101 is configured to interact with the access devices 102 and 103, establish at least two transmission paths (such as a first transmission path and a second transmission path) between the terminal 101 and the user plane function entity 105 in the core network, and receive a message sent by the session function entity 104 by using the access devices 102 and 103, where the message instructs the terminal to transmit same data on the first transmission path and the second transmission path.

The first access device 102 and the second access device 103 are configured to establish data transmission paths between the user terminal 101 and the user plane function entity 105 based on the instruction of the session function entity 104, the user terminal 101, or another access device.

The session function entity 104 is configured to decide to initiate establishment of the at least two transmission paths between the terminal 101 and the user plane function entity 105, and instruct the terminal 101 or the user plane function entity 105 to transmit same data on the at least two paths.

The user plane function entity 105 is configured to allocate user plane resources to the at least two transmission paths, and transmit the same data on the at least two transmission paths.

The policy function entity 106 is configured to instruct or authorize the session function entity 104 to initiate the establishment of the at least two transmission paths between the terminal 101 and the core network, where the at least two transmission paths are used to transmit same data to a same user terminal.

The terms "first" and "second" in the first access device 102 and the second access device 103 are merely logically distinguished. During specific implementation, the first access device 102 and the second access device 103 may be different physical entities, or may be a same physical entity, for example, a same base station. According to different implementations, the first access device 102 and the second access device 103 may be communicatively connected or may be not communicatively connected, and may exchange information or may not need to exchange information. This is not limited in this embodiment of the present disclosure. The transmission path described in the embodiments of the present disclosure refers to a logical channel or a data path on which service data can be transmitted. There may be a plurality of implementations of the transmission path or a plurality of methods for establishing the transmission path. For example, the transmission path may be a user plane path between user equipment (UE) and a UPF that are in a 5G network.

The system 10 may be applied to a 4G network, a 5G network, and another future network. In the system 10 for improving service reliability provided in this embodiment of the present disclosure, the core network establishes at least two transmission paths for a same terminal, and the core network transmits same data with the terminal on each of the at least two transmission paths, so that transmission quality of a service is better ensured, and service reliability is improved.

Figure 2:
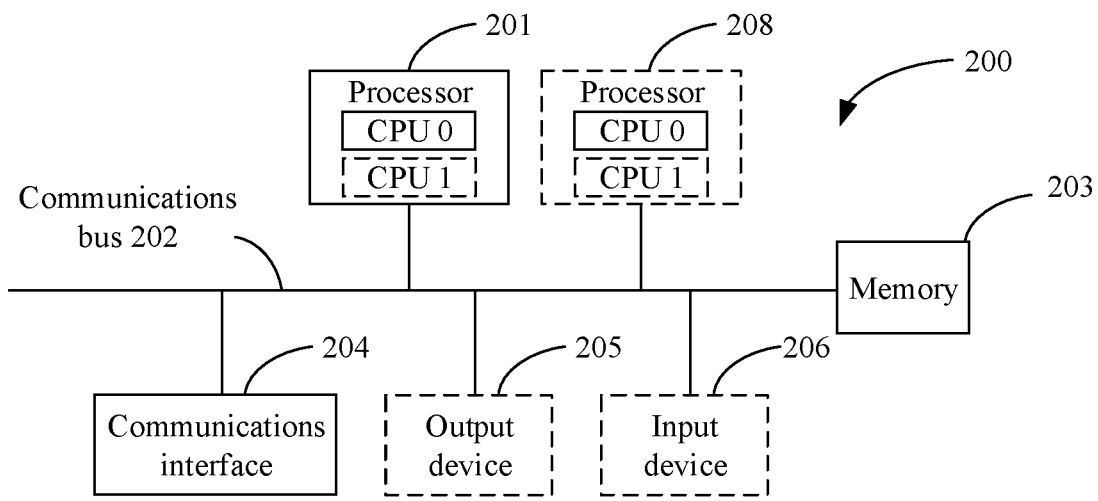
FIG. 2 is a schematic architectural diagram of a communications device 200 according to an embodiment of the present disclosure.
Figure 3:
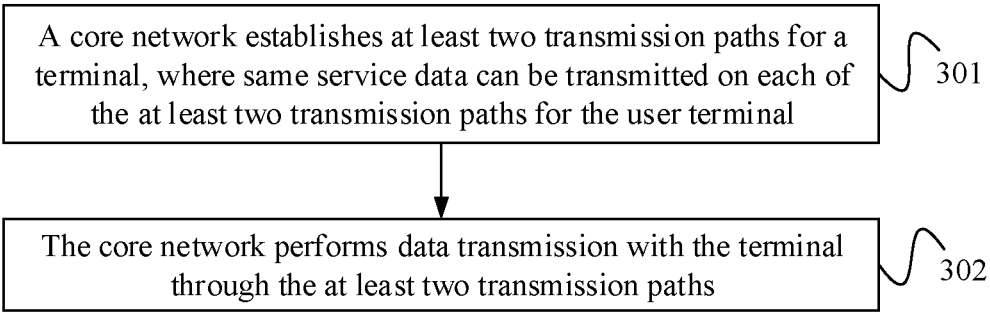
FIG. 3 is a schematic flowchart of a method S300 for improving service reliability according to an embodiment of the present disclosure.

The session function entity 104, the terminal 101, or another function entity in FIG. 1 may be implemented by a communications device 200 in FIG. 2. The communications device 200 includes at least one processor 201, a communications bus 202, a memory 203, and at least one communications interface 204. The processor 201 may be a general-purpose central processing unit (CPU), a microprocessor, an application-specific integrated circuit (ASIC), or one or more integrated circuits that are configured to control program execution in the solutions of this application. The communications bus 202 may include a channel for transmitting information between the foregoing components. The communications interface 204 uses any apparatus such as transceiver, and is configured to communicate with another device or communications network, such as an Ethernet, a radio access network (RAN), or a wireless local area network (WLAN). The memory 203 may be a read-only memory (ROM), another type of static storage device that can store static information and an instruction, or a random access memory (RAM), or another type of dynamic storage device that can store information and an instruction. Alternatively, the memory 203 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently, and is connected to the processor by using the bus. The memory may be integrated with the processor. The memory 203 is configured to store application program code for performing the method in the following embodiments in this application, and the processor 201 controls execution. The processor 201 is configured to execute the application program code stored in the memory 203, to implement the method for improving service reliability provided in the following embodiments of this application.

In an embodiment, the processor 201 may include one or more CPUs, such as a CPU 0 and a CPU 1 in FIG. 2. In an embodiment, the communications device 200 may include a plurality of processors, such as the processor 201 and a processor 208 in FIG. 2. Each of the processors may be a single-core (single-CPU) processor, or may be a multi-core (multi-CPU) processor. The processor herein may be one or more devices, circuits, and/or processing cores configured to process data (for example, a computer program instruction). In an embodiment, the communications device 200 may further include an output device 205 and an input device 206. The output device 205 communicates with the processor 401, and may display information in a plurality of manners. For example, the output device 405 may be a liquid crystal display (LCD), a light emitting diode (LED) display device, a cathode ray tube (CRT) display device, a projector, or the like. The input device 206 communicates with the processor 201, and may receive user input in a plurality of manners. For example, the input device 206 may be a mouse, a keyboard, a touchscreen device, a sensing device, or the like.

Based on the system 10 and the communications device 200, an embodiment of this application provides a method S300 for improving service reliability. At least two transmission paths are established for a same terminal, and same service data is transmitted on each of the at least two transmission paths for the terminal, so that transmission quality of a service is better ensured, and service reliability is improved.

S301. A core network determines to initiate establishment of at least two transmission paths between the core network and a user terminal, where the at least two transmission paths can simultaneously transmit same service data to the user terminal.

A session function entity in the core network may actively initiate the establishment, or may initiate the establishment of the at least two transmission paths between a user plane function entity in the core network and the terminal based on a request of the terminal or a request of a policy function entity. For example, the terminal sends, based on a configuration of the terminal, a service requirement, or a network environment, a master and secondary transmission path establishment request to the session function entity. Alternatively, the policy function entity and/or the session function entity actively initiates, based on a network status, a service attribute, or a QoS improvement request sent by the terminal, the establishment of the at least two transmission paths. Certainly, the establishment of the at least two transmission paths may alternatively be initiated by the terminal and network elements of the core network through negotiation in a cooperative manner. This is not limited in this embodiment of the present disclosure.

The at least two transmission paths may be simultaneously established, or may be established in sequence, provided that the at least two transmission paths can simultaneously transmit same data for a same user terminal. The at least two transmission paths may be in a mutual master-secondary relationship. In this case, same service data may be transmitted simultaneously on the at least two transmission paths. Alternatively, service data may be currently transmitted on some of the transmission paths. Although no data is being transmitted on another transmission path, the another transmission path is already established and is in a prepared state. Same service data may be transmitted simultaneously on the another transmission path and a current transmission path as triggered by a configuration of the core network, a configuration of the terminal, or a service environment.

The core network may establish the at least two transmission paths to the terminal by using different access devices. Alternatively, the core network may establish a plurality of transmission paths to the terminal by using a same access device. Alternatively, the core network may initiate establishment of a plurality of transmission paths by using one access device as an anchor. Because the session function entity in the core network stores access type information of the terminal, the session function entity may learn, based on access information of the terminal, whether the terminal has a control plane connection to each of two access devices. If the terminal has a control plane connection to each of the two access devices, the core network and each of the access devices establish a transmission path. If the terminal has a control plane connection to only one access device, another access device is instructed by the access device, to initiate establishment of a plurality of transmission paths.

S302. The core network performs data transmission with the terminal through the at least two transmission paths.

The data transmission herein may be that same data is being transmitted simultaneously on the at least two transmission paths. Alternatively, the data transmission herein may be that service data is actually being transmitted on some of the transmission paths, and another transmission path is already established and is in a state in which no data transmission is actually performed. Same service data may start, as triggered by a configuration of the core network and/or a configuration of the terminal, or a service environment, to be transmitted on the transmission path in the state in which no data transmission is actually performed.

On a core network side, the core network may simultaneously deliver same service data to the terminal on the at least two transmission paths (dual sending or bi-casting). The core network may also simultaneously receive, on the at least two transmission paths, same service data sent by the terminal, and perform deduplication processing (dual receiving).

On a terminal side, the terminal may receive, on the at least two transmission paths, service data sent by the core network, and perform deduplication processing (dual receiving). The terminal may also simultaneously send same service data to the core network on the at least two transmission paths (dual sending or bi-casting).

The following uses two transmission paths as an example to describe a data sending mechanism and a data receiving mechanism on a core network side and on a terminal side.

Figure 4:
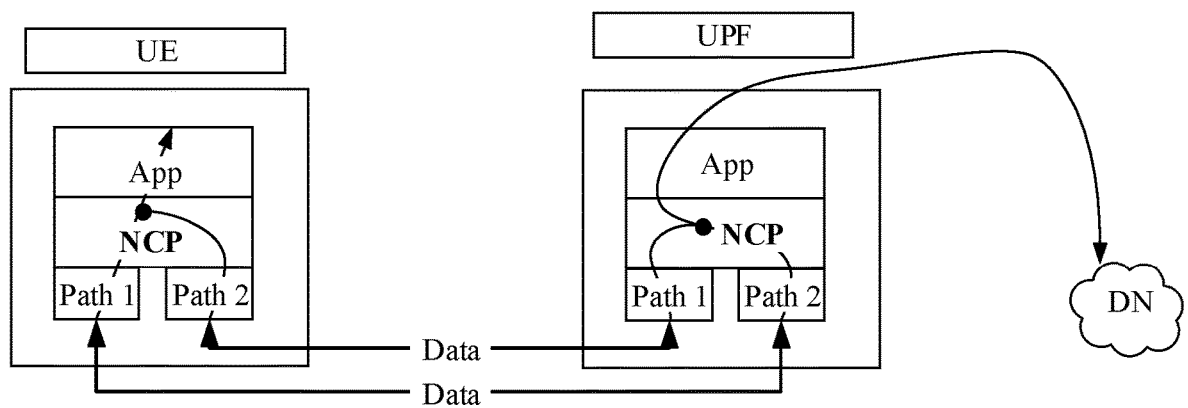
FIG. 4 is a schematic diagram of implementing data transmission through two transmission paths by a terminal and a user plane function entity according to an embodiment of the present disclosure.

In this embodiment of the present disclosure, a protocol stack may be added to each of the UE and the user plane function entity in the core network, to implement the dual sending and dual receiving functions described in the method S300. Referring to FIG. 4, it can be learned that, the user terminal and the user plane function entity in the core network implement data transmission through two transmission paths, and perform dual sending processing and dual receiving processing by using the protocol stacks. An NCP is a network control protocol. A first transmission path (Path1) and a second transmission path (Path2) may be both 3GPP paths, or may be a 3GPP path and a non-3GPP path.

FIG. 4 shows a transmission direction of a data flow. For a dual sending mechanism on a transmitter side and a dual receiving mechanism on a receiver side, reference may further be made to FIG. 5. It can be learned that, at a user terminal UE, a packet of an APP that needs to be sent is sent to a baseband chip of a mobile phone by using a local bus or the like. The baseband chip receives a service packet from an upper layer, replicates the packet, marks packets with sequence numbers and NCP IDs, and then sends the packets on the path 1 and the path 2. After receiving the packets, a user plane function entity side removes protocol headers related to the path 1 and the path 2, performs deduplication based on the NCP IDs and the sequence numbers, and then sends a data packet to a data network (DN).

Figure 5:
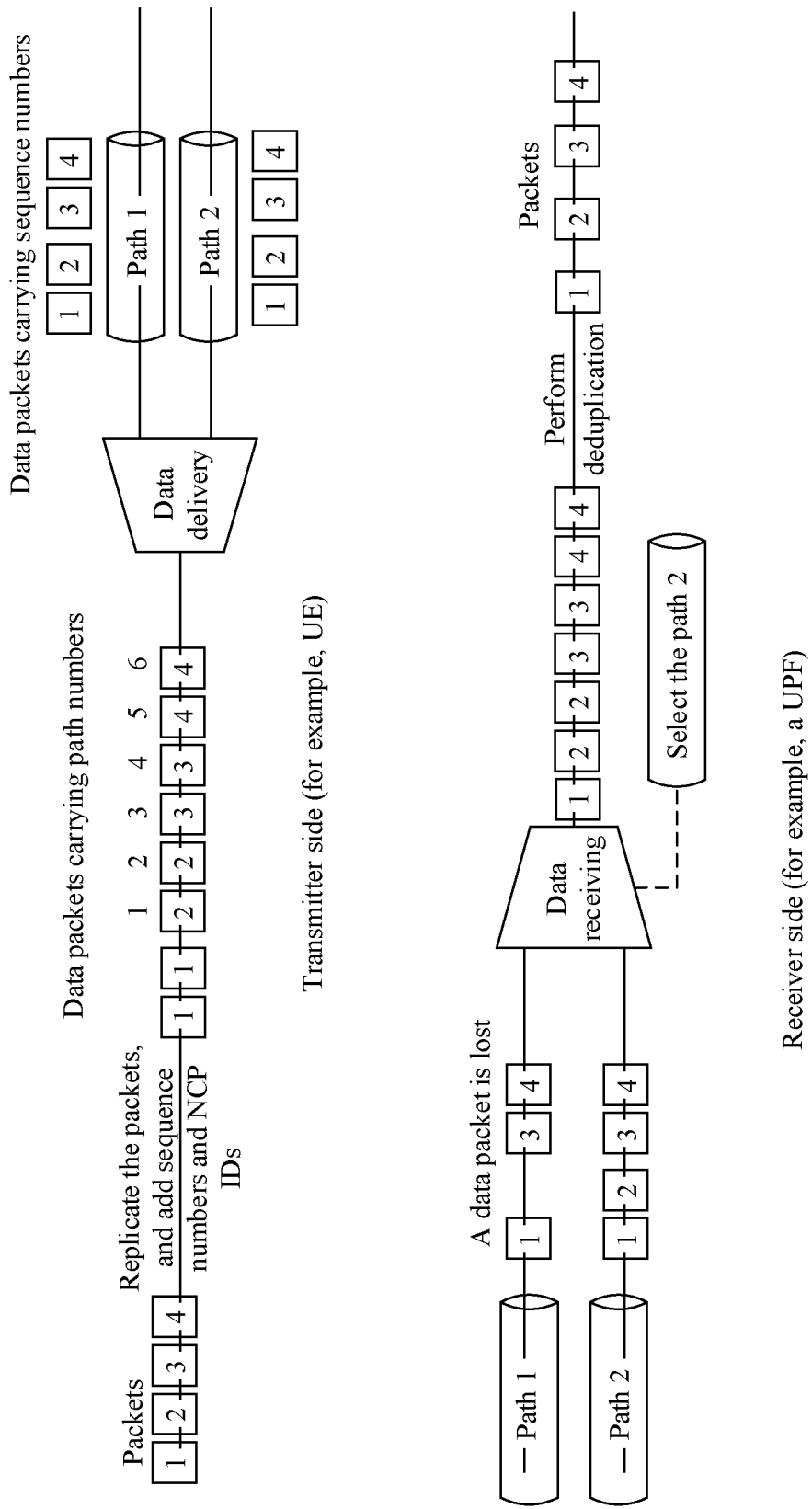
FIG. 5 is a schematic diagram of a dual sending mechanism on a transmitter side and a dual receiving mechanism on a receiver side according to an embodiment of the present disclosure.

It can be learned from the receiver side in FIG. 5 that, during transmission, a data packet whose sequence number is 2 is lost on the first transmission path (path1). Because a master-secondary transmission path mechanism is used, when receiving data, a system may obtain the lost data packet whose sequence number is 2 on the second transmission path, thereby improving quality and reliability of data receiving.

For example, as shown in FIG. 5, on the receiver side, one of the two established transmission paths may be selected, based on data transmission quality and/or link quality, for receiving (an alternative manner), and a deduplication operation does not need to be performed. For example, a network side or the terminal periodically performs sampling to monitor data transmission quality of the two transmission paths, and selects in time, based on a dynamic change of the quality, a transmission path with higher transmission quality or a transmission path that better meets a current service requirement (a most stable or fastest transmission path), for receiving data. Compared with a manner in which deduplication needs to be performed, the alternative manner can reduce burden of deduplication processing on the receiver side.

According to the method for improving service reliability in this embodiment of the present disclosure, at least two transmission paths to the core network are established for a same terminal, same service data can be transmitted simultaneously on two transmission paths, and the dual sending mechanism and the dual receiving mechanism are further used on the transmitter side and on the receiver side respectively, thereby implementing high-reliability data transmission.

The following uses two transmission paths as an example for description. In this embodiment, the two transmission paths are referred to as a first transmission path and a second transmission path, or are referred to as a master transmission path and a secondary transmission path (a master path and a secondary path). A correspondence between the master path and the secondary path, and the first transmission path and the second transmission path is not limited in this embodiment. In other words, the first transmission path or the second transmission path may be a master/secondary transmission path to each other.

Figure 6:
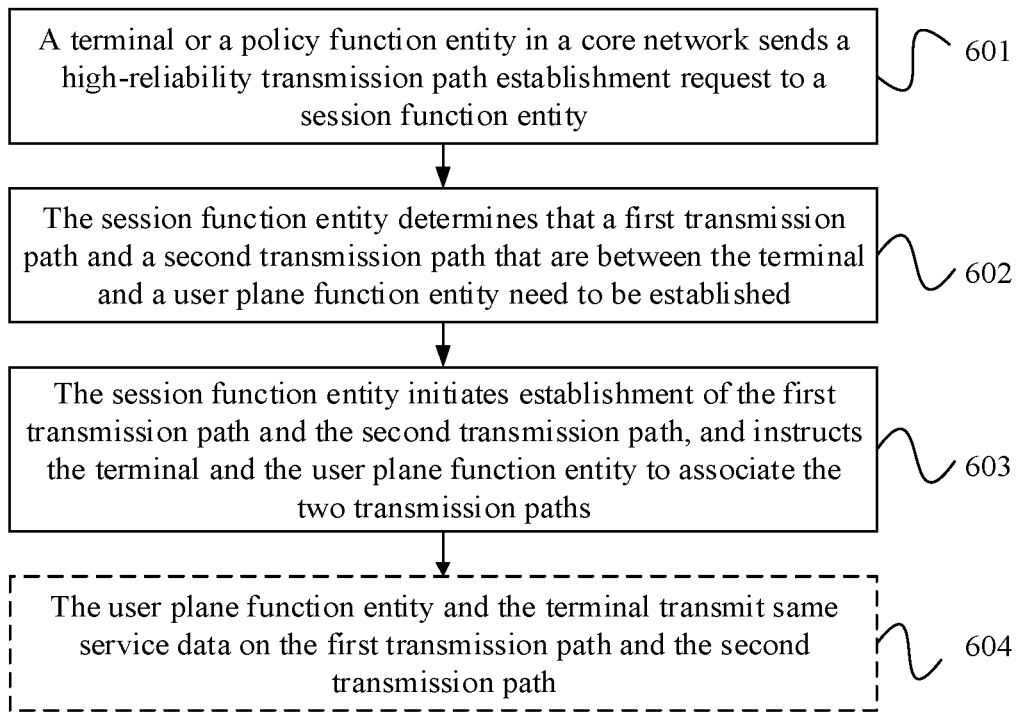
FIG. 6 is a schematic diagram of a method 600 for simultaneously initiating establishment of two transmission paths according to an embodiment of the present disclosure.

In a method S600, referring to FIG. 6, steps of initiating establishment of each of the two transmission paths are described as follows.

S601. When a terminal or a policy function entity in a core network needs to ensure data transmission of a high-reliability service, the terminal or the policy function entity sends a high-reliability transmission path establishment request to a session function entity.

S602. The session function entity determines that two transmission paths, namely, the first transmission path and the second transmission path, between the terminal and a user plane function entity need to be established.

S603. The session function entity initiates establishment of the first transmission path and the second transmission path, and notifies an access device and a user terminal of identifiers and an association relationship that are of the two transmission paths, to establish the two transmission paths.

The two transmission paths may be established in two manners by using the access device.

Manner 1. The session function entity establishes the first transmission path and the second transmission path by using a first access device and a second access device respectively. The manner may include the following steps.

S6031. Instruct the first access device to establish the first transmission path. Details are not described herein.

S6032. Notify the second access device of identifiers of the first transmission path and the second transmission path, and an association identifier; and instruct the second access network device to establish the second transmission path.

S6033. Notify the user plane function entity in the core network of resources and identification information that are of the first transmission path and the second transmission path, and an association identifier; and instruct the user plane function entity in the core network to complete the establishment of the two transmission paths.

In this embodiment, the core network initiates establishment of each of the two transmission paths, and there may be no interaction between the access devices that are responsible for bearing the two transmission paths. In this manner, 3GPP access devices can bear the two transmission paths respectively, or a 3GPP access device and a non-3GPP access device can bear the two transmission paths respectively. It should be noted that, the first access device and the second access device may be a same access device (for example, a same base station) during implementation. However, from a perspective of reliability improvement, reliability or robustness of data transmission can be further improved when the two access devices are implemented by different access devices, or even a 3GPP access device and a non-3GPP access device.

Manner 2. The core network instructs, by using a first access device, a second access device to establish the second transmission path.

S603a. The session function entity instructs the first access device to interact with the terminal to establish the first transmission path (details are not described herein). Further, the session function entity instructs the first access device to instruct the second access device to interact with the terminal (exchanged information includes identifiers of the first transmission path and the second transmission path, and a backup identifier), to establish the second transmission path.

S603b. Notify the user plane function entity of resources and identification information that are of the first transmission path and the second transmission path, and an association identifier; and instruct the user plane function entity to complete the establishment of the two transmission paths.

In this embodiment, after receiving a second transmission path establishment request, the first access device triggers the second access device and the terminal to establish the second transmission path. In this implementation, the network is slightly changed, and is more easily compatible with an existing network.

The session function entity instructs, by using the association identifier, the terminal or the user plane function entity to associate the first transmission path with the second transmission path. The association includes sending, by the user plane function entity or the terminal, same data on each of the first transmission path and the second transmission path; or deduplicating, by the user plane function entity or the terminal, data received on the first transmission path and the second transmission path; or selecting, by the terminal, one transmission path from the first transmission path and the second transmission path to receive data.

For the terminal, the session function entity usually adds an association label to the second transmission path establishment request, and instructs, by using the association label (or a backup label), the terminal to associate (or bind) the two transmission paths.

For the user plane function entity on a core network side, after receiving a response message indicating that the establishment of the second transmission path is completed, the session function entity may instruct the user plane function entity to associate (or bind) the two transmission paths. A notification message may carry the association label (or the backup label) and the identifiers of the first transmission path and the second transmission path.

In addition, in step 603, when initiating the establishment of the two transmission paths, the session function entity may further instruct the user plane function entity or the terminal to enable a dual sending function and/or a dual receiving function. An indication to enable the dual sending function and/or the dual receiving function may be carried in a notification message that is for the establishment of the first transmission path and/or the second transmission path and that is sent by the session function entity. This is not limited in this embodiment of the present disclosure.

S604. If the session function entity instructs the user plane function entity or the terminal to perform dual sending and/or dual receiving, the user plane function entity or the terminal may transmit same data on each of the first transmission path and the second transmission path that are associated.

The session function entity may instruct the user plane function entity or the terminal to perform dual sending and/or dual receiving at a same time when the session function entity initiates the establishment of the first transmission path and the second transmission path. Alternatively, after the establishment of the two transmission paths is completed, the session function entity may instruct, based on a network status and a service status, the user plane function entity or the terminal to actually perform dual sending and/or dual receiving by using the two established transmission paths.

According to the method S600 in this embodiment of the present disclosure, two transmission paths are established between the terminal and a network side at an initial stage to transmit same service data, so that reliability of data transmission is improved.

Figure 7:
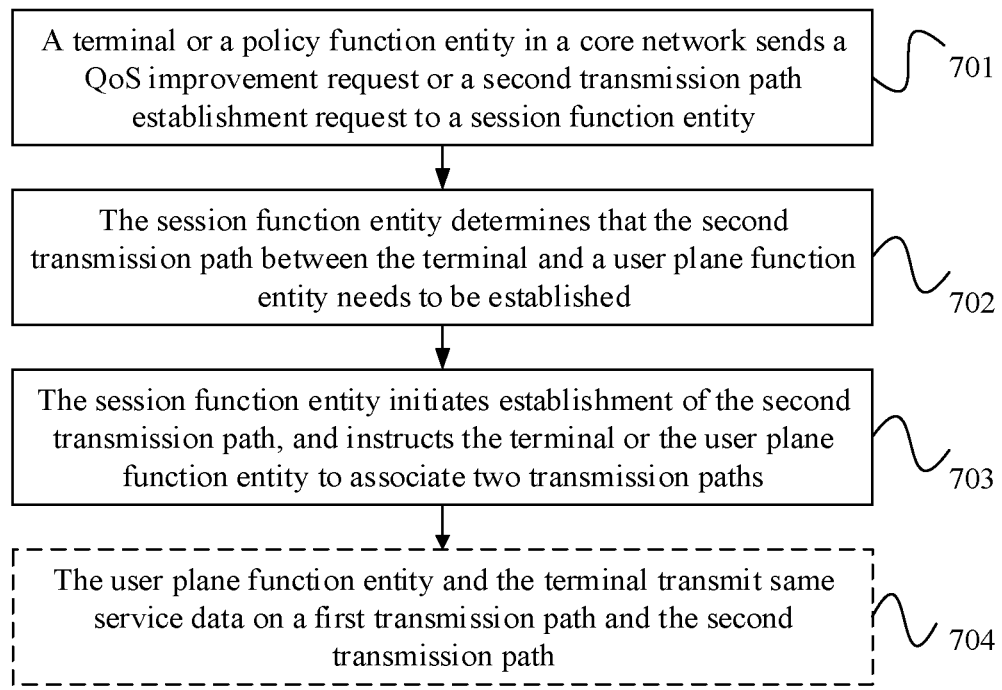
FIG. 7 is a schematic diagram of a method 700 for initiating establishment of a new transmission path according to an embodiment of the present disclosure.

In a method S700, referring to FIG. 7, there is already one transmission path between a terminal and a user plane function entity in a core network, and a new transmission path still needs to be established.

S701. When the terminal or a network side needs to improve a requirement for transmission QoS, the terminal or the network side sends a QoS improvement request to a session function entity.

In this case, there is already one transmission path between the terminal and the network side, or optionally, service data is being transmitted on a first transmission path. However, transmission quality needs to be improved or maintained because of a case in which a service requirement or a network status is changed. Therefore, the session function entity needs to be requested to improve QoS. In addition, the terminal or a network element on the network side, such as a policy function entity or the user plane function entity, may alternatively send a second transmission path (secondary path) establishment request to the session function entity directly.

S702. The session function entity determines that a second transmission path between the terminal and the user plane function entity needs to be established.

The session function entity may decide, based on a QoS requirement of a service and/or a local network load status, to establish the second transmission path. The session function entity may further request authorization from the policy function entity. The policy function entity decides to establish the second transmission path for the service, and sends a response to the session function entity. In addition, the session function entity may alternatively initiate, based on the received second transmission path establishment request, establishment of the second transmission path directly.

S703. The session function entity initiates the establishment of the second transmission path. The second transmission path may be established in two manners by using an access device.

Manner 1. The first transmission path is already established by the core network by using a first access device, and in this case, the core network establishes the second transmission path by using a second access device.

S7031. Notify the second access device of identifiers of the first transmission path and the second transmission path, and an association identifier; and instruct the second access network device to establish the second transmission path.

S7032. Notify the user plane function entity of a resource of the second transmission path, identification information of the first path, and an association identifier; and instruct the user plane function entity to complete the establishment of the second transmission path on a user plane function entity side.

The core network initiates establishment of one new transmission path (the second transmission path), and there may be no interaction between the access devices that are responsible for bearing the two transmission paths. In this manner, 3GPP access devices can bear the two transmission paths respectively, or a 3GPP access device and a non-3GPP access device can bear the two transmission paths respectively. It should be noted that, the first access device and the second access device may be a same access device (for example, a same base station) during implementation.

Manner 2. The core network instructs, by using a first access device, a second access device to establish the second transmission path.

S703a. Notify the first access device of identifiers of the first transmission path and the second transmission path, and an association identifier. The first access device instructs the terminal and the second access device to establish the second transmission path (the secondary path).

S703b. Notify the user plane function UPF entity of a resource of the second transmission path, identification information of the first transmission path, and an association identifier; and instruct the user plane function entity to complete the establishment of the second transmission path on a user plane function entity side.

After receiving the second transmission path establishment request, the first access device instructs the terminal and the second access device to establish the second transmission path. The network is slightly changed, and is more easily compatible with an existing network.

When initiating the establishment of the second transmission path, the session function entity may instruct the terminal or the user plane function entity to associate the first transmission path with the second transmission path. The association includes sending, by the user plane function entity or the terminal, same data on each of the first transmission path and the second transmission path; or deduplicating, by the user plane function entity or the terminal, data received on the first transmission path and the second transmission path; or selecting one transmission path from the first transmission path and the second transmission path to receive data.

For the terminal, the session function entity adds an association label to the second transmission path establishment request, and instructs, by using the association label, the terminal to associate (or bind) the two transmission paths. For the user plane function entity on a core network side, after receiving a response message indicating that the establishment of the second transmission path is completed, the session function entity may instruct the user plane function entity to associate (or bind) the two transmission paths.

In addition, in step 703, when initiating establishment of a master transmission path and a secondary transmission path, the session function entity may further instruct the user plane function entity or the terminal to start to perform dual sending and/or dual receiving. An indication for the dual sending and/or the dual receiving may be carried in a notification message for the establishment of the second transmission path sent by the session function entity. This is not limited in this embodiment of the present disclosure.

S704. If the session function entity instructs the user plane function entity or the terminal to perform dual sending and/or dual receiving, the user plane function entity or the terminal may transmit same data on each of the first transmission path and second transmission path that are associated.

According to the method S700 in this embodiment of the present disclosure, when there is already the first transmission path, or data is being transmitted on the first transmission path, the terminal or the network side initiates the establishment of the second transmission path based on a service requirement, a change of a network status, or the like. Same service data may be transmitted on each of the first transmission path and the second transmission path, so that reliability and flexibility of data transmission are improved. Because the two transmission paths do not need to be simultaneously established at the beginning, network resources and processing burden that are of the terminal and the network side are reduced, and flexibility is improved.

The foregoing system 10 for improving service reliability, the communications apparatus 200, the method S300, the dual sending mechanism on the transmitter side and the dual receiving mechanism on the receiver side shown in FIG. 4 and FIG. 5, the method S600, and the method S700 may all be applied to a current 4G, 4.5G, or 5G network, and another future network. For example, the session function entity may be a session management function (SMF) in 5G or a PDN Gataway or packet data gateway (PGW) in 4G; the policy function entity may be a policy control function (PCF) in 5G or a policy and charging rules function (PCRF) in 4G; the user plane function entity may be a user plane function (UPF) in 5G or a gateway user plane function (GW-U) in 4G.

Figure 8A:
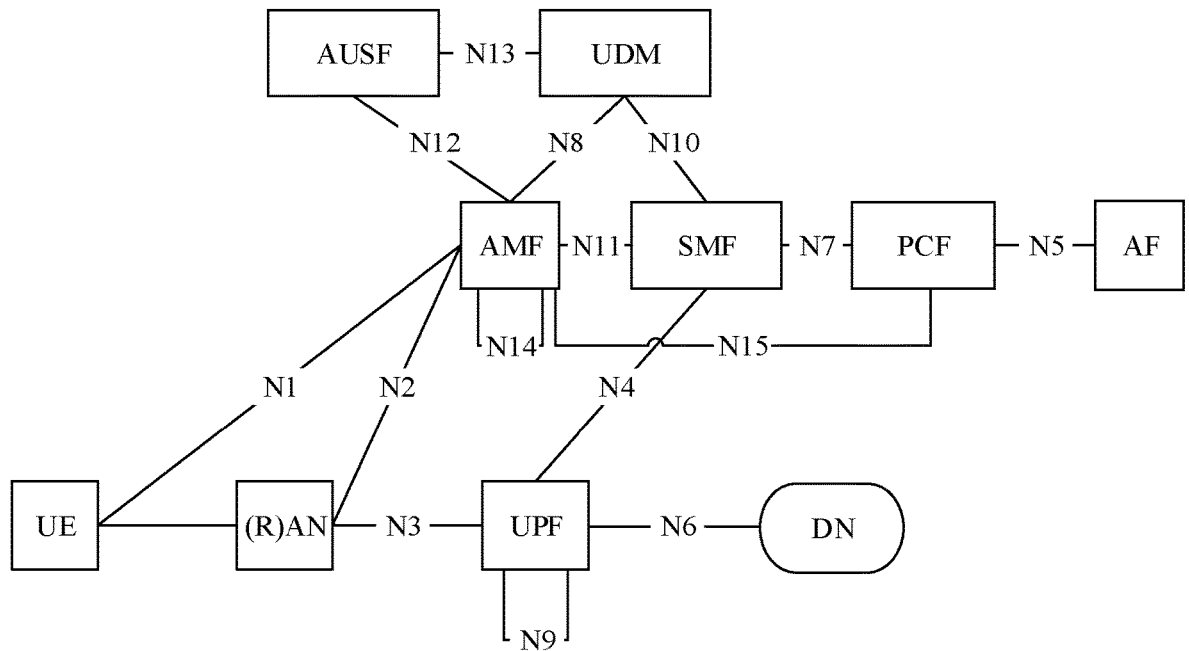
FIG. 8A and FIG. 8B are schematic architectural diagrams of a 5G system according to an embodiment of the present disclosure.
Figure 8B:
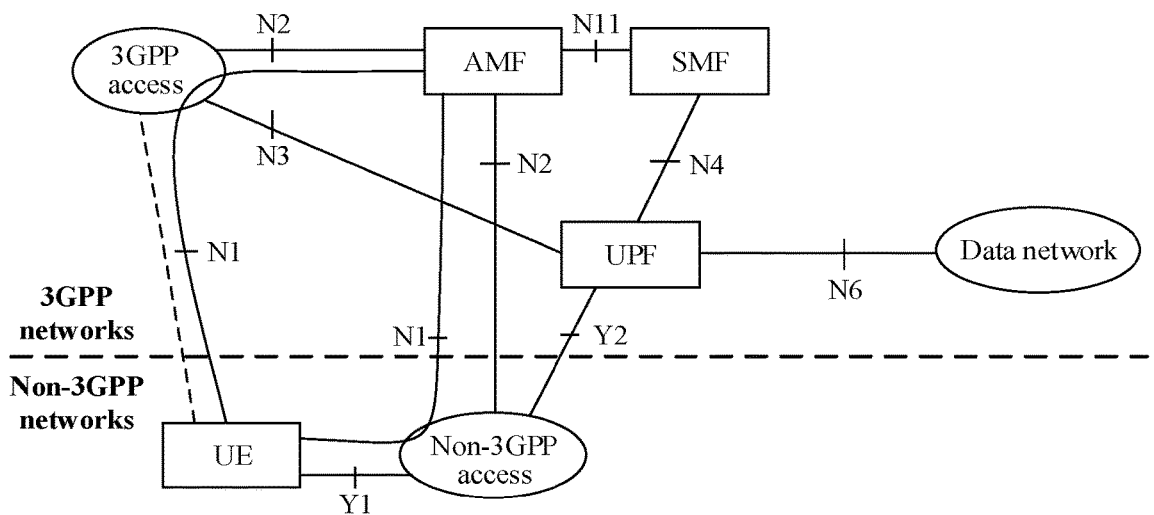

The foregoing system, communications apparatus, and methods are applied to a 5G network, and possible applicable architectures include architectures shown in FIG. 8A and FIG. 8B. In FIG. 8A, UE accesses a network by using only a 3GPP access device. In FIG. 8B, UE accesses a network by using both a 3GPP access device and a non-3GPP access device. It should be noted that, in each of the two architectures shown in FIG. 8A and FIG. 8B, there is a control plane connection between an AMF and the access device used by the UE to access the network.

Table 1 briefly describes names and function descriptions of main network elements in FIG. 8A and FIG. 8B.

TABLE 1

| Name of the network element | Function description |
| --- | --- |
| Radio access network ((R)AN in FIG. 8A; 3GPP Access in FIG. 8B) | Includes various access devices such as a radio base station, and is used for radio resource management, uplink and downlink data classification, user plane data forwarding, and the like. |
| AMF | Performs access control and mobility management functions. |
| SMF | Performs a session management function such as PDU session establishment, QoS Flow establishment, or UPF user plane resource establishment. |
| UPF | Performs functions such as user data forwarding and user data routing, and performs a function such as data statistics collection, rate limitation, or statistics reporting. |
| Non-3GPP Access | Non-3GPP access, for example, an access device such as WIFI |

It should be noted that, a QoS flow is a minimum granularity for distinguishing QoS in 5G, and same forwarding processing, including a scheduling policy, queue management, traffic shaping, and resource configuration, is performed on all service flows in one QoS flow. Different QoS flows need to be used to provide different QoS processing. One transmission path is corresponding to one QoS flow.

Figure 9A:
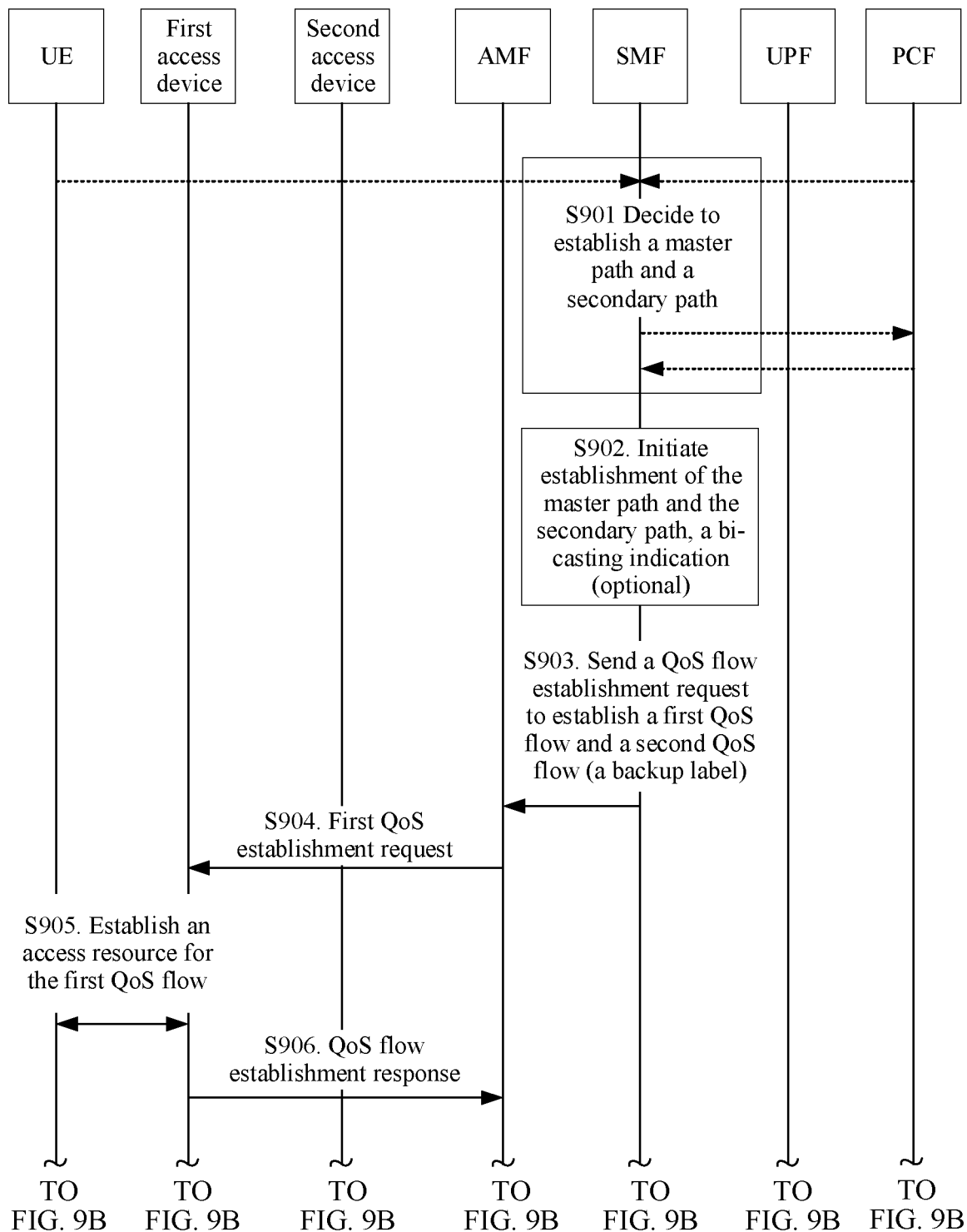
FIG. 9A and FIG. 9B are a signaling flowchart of a method 900 for simultaneously initiating establishment of two transmission paths in a 5G scenario according to an embodiment of the present disclosure.
Figure 9B:
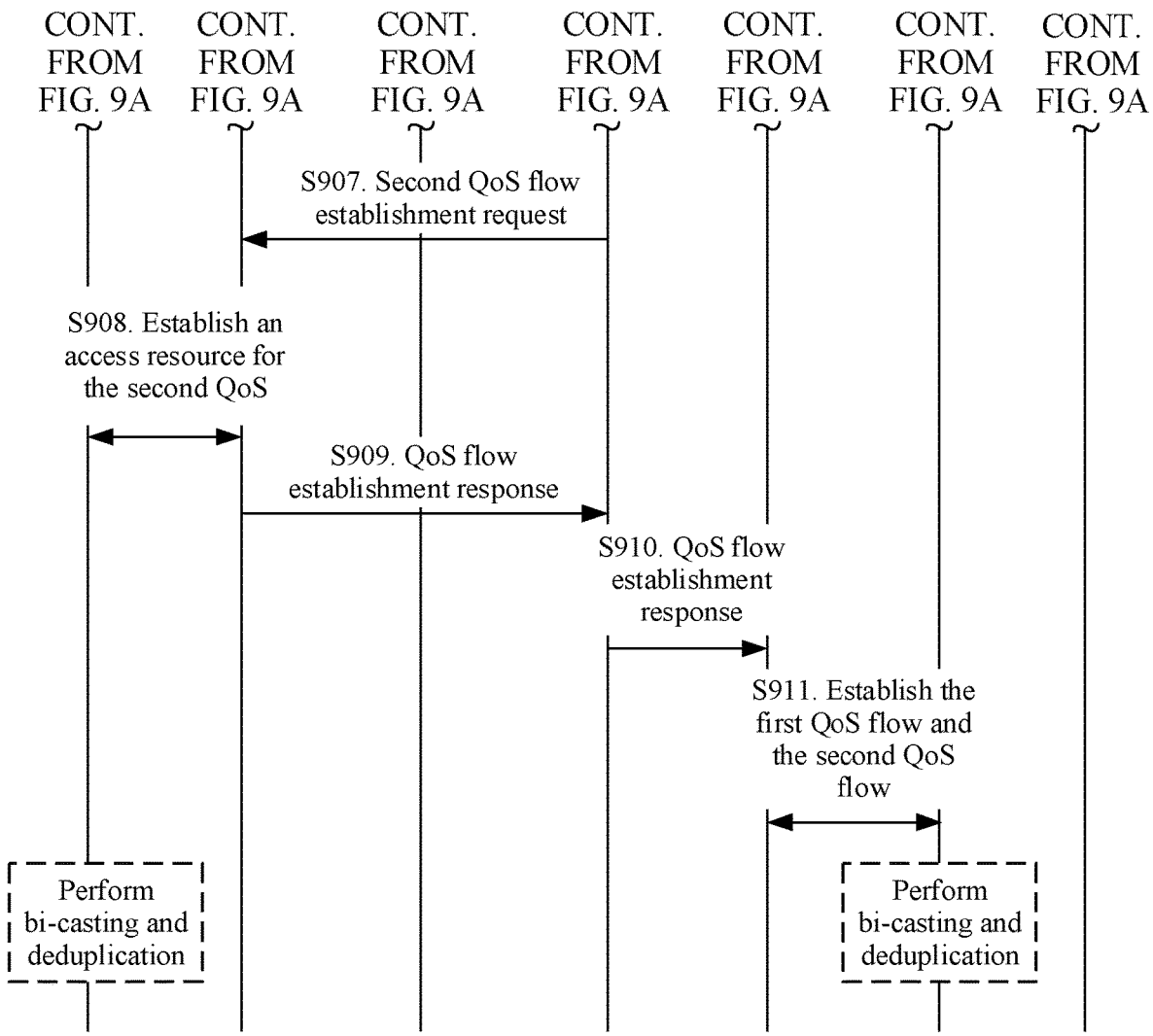

FIG. 9A and FIG. 9B show a procedure of establishing a first transmission path and a second transmission path (a master path and a secondary path) based on the architectures in FIG. 8A and FIG. 8B. Establishment of the master path and the secondary path at an initial stage can ensure that in addition to the master path, the secondary path may be available to a service (for example, a URLLC service) having a high reliability requirement. Steps in an embodiment 900 are described as follows.

S901. Decide to establish the master transmission path and the secondary transmission path. There may be the following cases.

a. UE sends a service request to an SMF, where the service request includes a QoS parameter, a master and secondary path establishment indication (optional), and the like. The SMF decides, based on a UE type (for example, the UE is a URLLC terminal), a QoS requirement, and the like and with reference to a network load status and a master and secondary path indication label (optional), to establish a master QoS flow and a secondary QoS flow for the service requirement of the UE.

b. After receiving a service request of UE, an SMF may further request authorization from a PCF, for example, send a master and secondary path establishment request to the PCF, where a request message carries a QoS parameter such as a 5G QoS indicator (5QI) or a 5G QoS label, or a QoS requirement. The PCF decides, based on subscription information of the UE and the QoS parameter, to authorize the SMF to establish the master path and the secondary path for the UE, and the PCF sends a master and secondary path establishment response message to the SMF, where the message indicates that the SMF may establish the master path and the secondary path for the service request of the UE.

c. A PCF sends a service request to an SMF, where the service request includes a QoS parameter, a master and secondary path indication (Optionally, after receiving the service request of a DN, the PCF decides, based on subscription information of UE and the QoS parameter, that a master path and a secondary path need to be established for the service. In this case, a master and secondary path indication label may be carried), and the like. The SMF decides, based on a UE type (a URLLC terminal), a QoS requirement, and the like and with reference to a network load status and the master and secondary path indication label (optional), to establish a master QoS flow and a secondary QoS flow for the service requirement of the UE (or directly establishes the master path and the secondary path for the UE based on a master and secondary path establishment indication of the PCF).

S902. The SMF initiates the establishment of the master path and the secondary path, where this step includes allocating, by the SMF, user plane resources to the master QoS flow and the secondary QoS flow, and the user plane resources mainly include a QoS flow identities or QoS flow identifiers (QFIs) of the master QoS flow and the secondary QoS flow, a packet detection rule and a charging rule, and the like. The allocation is as follows, allocating QoS flow-related resources (for example, policy and charging control (PCC) rules) such as the QFIs corresponding to the master QoS flow and the secondary QoS flow. Charging policies or QoS policies of the two QoS flows may be the same or different (for example, a second QoS flow may be no longer be charged). This is not limited in this embodiment.

In this case, the SMF may further decide, based on a URLLC service type and/or a terminal type, whether to instruct a UPF and/or the UE to enable a dual transmission (dual sending and/or dual receiving) function.

If the URLLC terminal is a high-speed mobile terminal (indicated by a QoS parameter, a service type, a terminal type, and the like), it indicates that instability of a network of the URLLC terminal is relatively high. A dual transmission indication notification is carried in a notification message that is for the establishment of the master path and the secondary path and that is delivered by the SMF, to instruct the UPF and the UE to perform dual transmission. If the URLLC terminal is a low-speed mobile terminal, it indicates that a network path of the URLLC terminal is relatively stable. Only the master path and the secondary path are established for the URLLC terminal, and dual transmission is enabled subsequently when needed.

S903. The SMF sends a master and secondary QoS flow establishment request to an AMF, where the request message carries the QFIs of the master QoS flow and the secondary QoS flow, a PDU session ID (if the master QoS flow and the secondary QoS flow are located in different PDU sessions, two PDU session IDs need to be carried), traffic flow templates (TFTs), QoS, a backup label, a dual transmission indication (optional), and the like.

The backup label is used to indicate a relationship between the two QoS flows. The relationship between the two QoS flows may be referred to as a master-secondary relationship, an association (associated) relationship, or a binding relationship. The UE or the UPF may determine, based on the backup label, to transmit same data on each of the two QoS flows.

S904 to S906. The AMF receives the master and secondary QoS flow establishment request sent by the SMF and sends a QoS flow establishment request to a first access device, where the request message carries the PDU session ID, a QoS rule, and the like. When receiving the QoS flow establishment request, the first access device maps the QoS rule to a radio QoS rule, and sends radio reconfiguration information to the UE, to complete establishment of a first QoS flow. The first access device sends a QoS flow establishment response message to the AMF, to notify the AMF that the establishment of the first QoS flow on a wireless side is completed.

S907. The AMF initiates a procedure of establishing secondary QoS, and sends a QoS flow establishment request message to a second access device, where the request message carries a QFI of the first QoS flow, a PDU session ID, a QFI of the second QoS flow, a PDU session ID (which may be different from or the same as the PDU session ID in which the first QoS flow is located, and this is not limited), the backup label, the dual transmission indication (optional), QoS, and the like.

S908. The second access device receives the secondary QoS flow establishment request, maps the QoS rule to the radio QoS rule, and sends the radio reconfiguration information to the UE, to complete establishment of the second QoS flow.

It should be noted that, a sequence in which the first QoS flow and the second QoS flow are established may be not limited.

A UE side completes binding (or associating) the two QoS flows based on the backup label, a first QoS flow identifier (the QFI and the PDU session ID), and a second QoS flow identifier (the PDU session ID and the QFI). For example, the second QoS flow that is to be established is bound with the first QoS flow that already exists, to complete associating the master path with the secondary path. Optionally, if the reconfiguration message includes the dual transmission indication, the UE enables dual transmission. For a sample implementation, refer to the manners in FIG. 4 and FIG. 5, and examples are as follows.

Uplink dual sending, the UE replicates a data packet, and replicates data corresponding to the first QoS flow to the UE. The UE sends an original data packet to the first access device by using a radio bearer corresponding to the first QoS flow, and sends a replicated data packet to the second access device by using a radio bearer in which the second QoS flow is located. The UE adds a dual transmission protocol header to each of the data packet corresponding to the first QoS flow and the data packet corresponding to the second QoS flow, where the protocol header carries a packet sequence number, an identifier, and the like. The UPF may implement a deduplication operation by parsing dual transmission protocol headers.

Downlink dual receiving, the UE receives a data packet that is corresponding to the first QoS flow and that is sent by the first access device and a data packet that is corresponding to the second QoS flow and that is sent by the second access device, and deduplicates the data packets based on dual transmission protocol header information (which mainly includes sequence numbers, identifiers, and the like) in the data packets.

S909. The second access device sends a QoS flow establishment response message to the AMF, to notify the AMF that the establishment of the second QoS flow on a wireless side is completed.

S910. The AMF sends a master and secondary QoS flow establishment response message to the SMF.

The message includes the first QoS flow identifier, the second QoS flow identifier, and the like.

S911. The SMF instructs the UPF to establish UPF side user plane resources for the first QoS flow and the second QoS flow.

The SMF allocates resources (QoS and charging rules obtained by the SMF from elsewhere, and a tunnel) and sends the rules to the UPF. The UPF stores/installs the rules, to implement establishment of the user plane resources.

In addition, the SMF sends an N4 session modification message to the UPF. The message carries the following content.

a. The first QoS flow identifier, the second QoS flow identifier, and the backup label. Based on the backup label, the first QoS flow identifier (the QFI and the PDU session ID), and the second QoS flow identifier (the PDU session ID and the QFI), a UPF side completes binding the two QoS flows. In other words, the UPF side completes associating the master path with the secondary path.

b. Dual transmission indication (optional). Based on the indication, referring to FIG. 4 and FIG. 5, the UPF performs the following actions. b1. Downlink dual sending, when receiving a data packet that is sent by a DN and that is corresponding to the first QoS flow, the UPF replicates the data packet. The UPF sends the original data packet to the first access device through an N3 tunnel in which the first QoS flow is located, and sends a replicated data packet to the second access device through an N3 tunnel in which the second QoS flow is located. The UPF adds a dual transmission protocol header to each of the data packet corresponding to the first QoS flow and the data packet corresponding to the second QoS flow, where the protocol header carries a packet sequence number, an identifier, and the like. The UE may implement a deduplication operation by parsing the dual transmission protocol headers. b2. Uplink dual receiving, the UPF receives a data packet that is corresponding to the first QoS flow and that is sent by the first access device and a data packet that is corresponding to the second QoS flow and that is sent by the second access device, and deduplicates the data packets based on dual transmission protocol header information (which mainly includes sequence numbers, identifiers, and the like) in the data packets.

c. Other PCC rules. The UPF sets up policy and charging rules related to the second QoS flow, and the like.

The UPF sends an N4 session modification response message to the SMF and completes establishment of the UPF side user plane resources for the master QoS flow and the secondary QoS flow.

In this embodiment, the URLLC service is identified on a network side, and the two paths, namely, the master path and the secondary path, are established for the service to improve service transmission quality and ensure reliability when there is an error. In addition, in this embodiment, there is no requirement for communication between the two access devices, so that a scenario in which the UE performs hybrid access by using both 3GPP and non-3GPP can be implemented, and transmission efficiency is maximized.

Figure 10A:
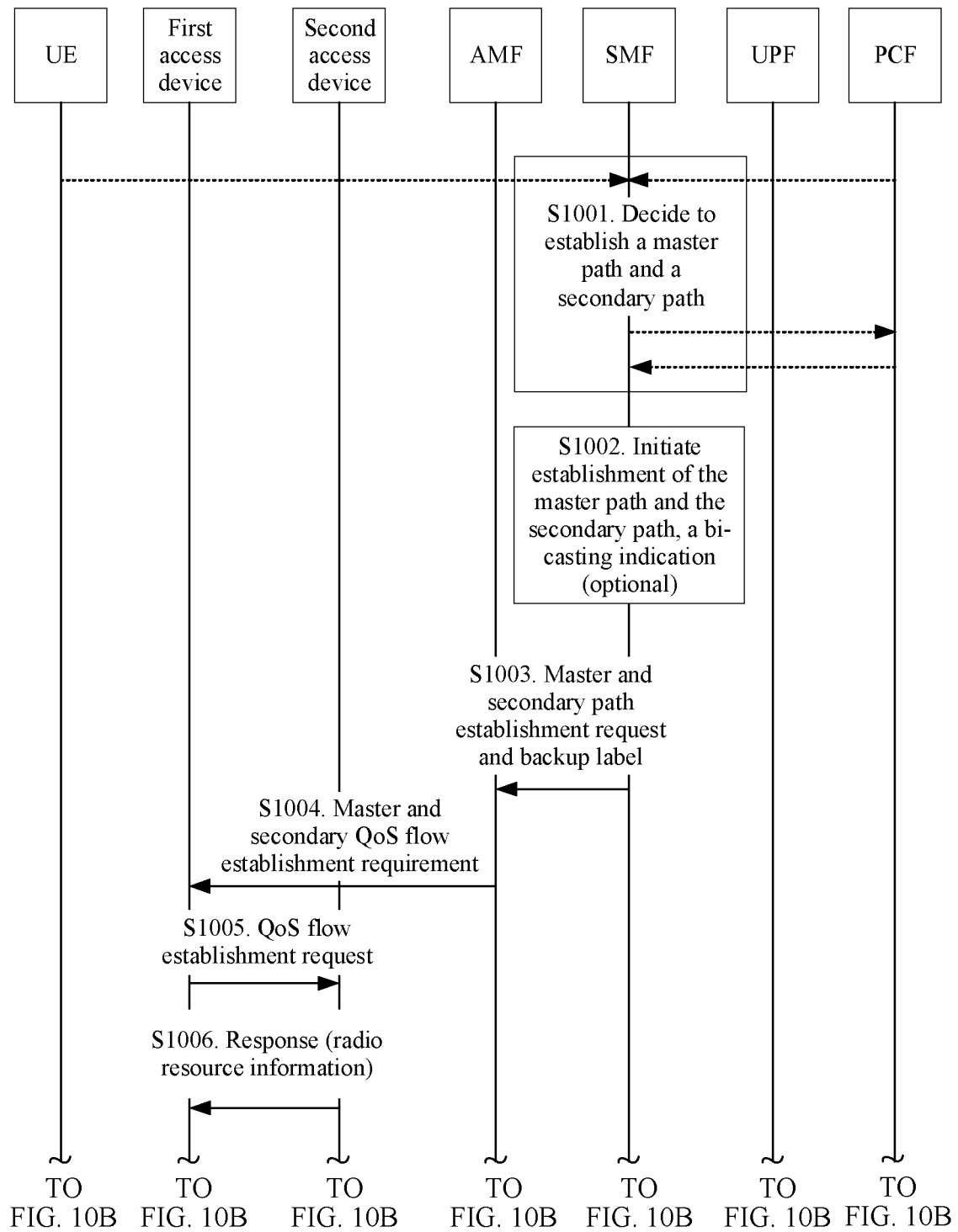
FIG. 10A and FIG. 10B are a signaling flowchart of a method 1000 for simultaneously initiating establishment of two transmission paths in a 5G scenario according to an embodiment of the present disclosure.
Figure 10B:
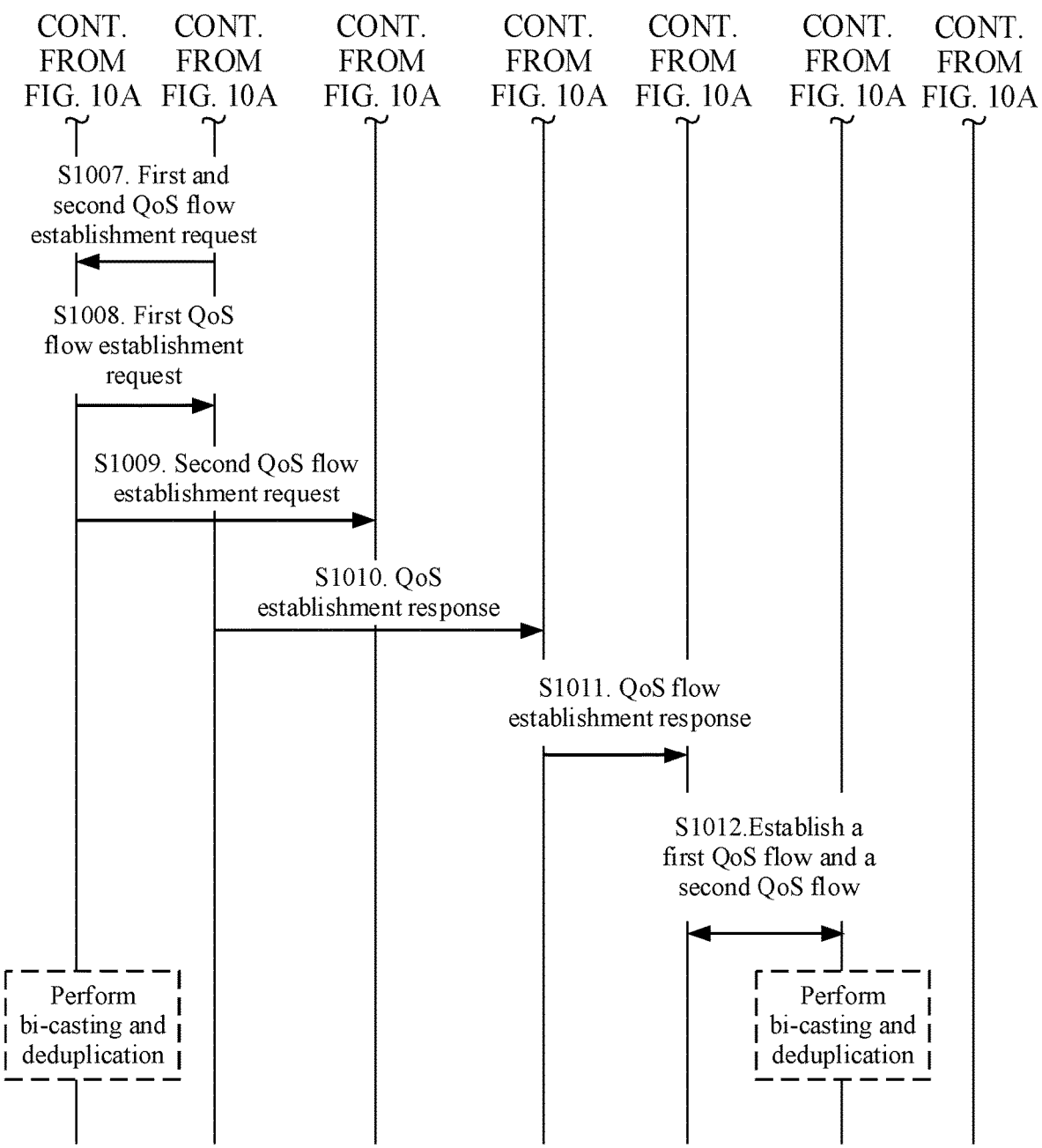
Figure 11A:
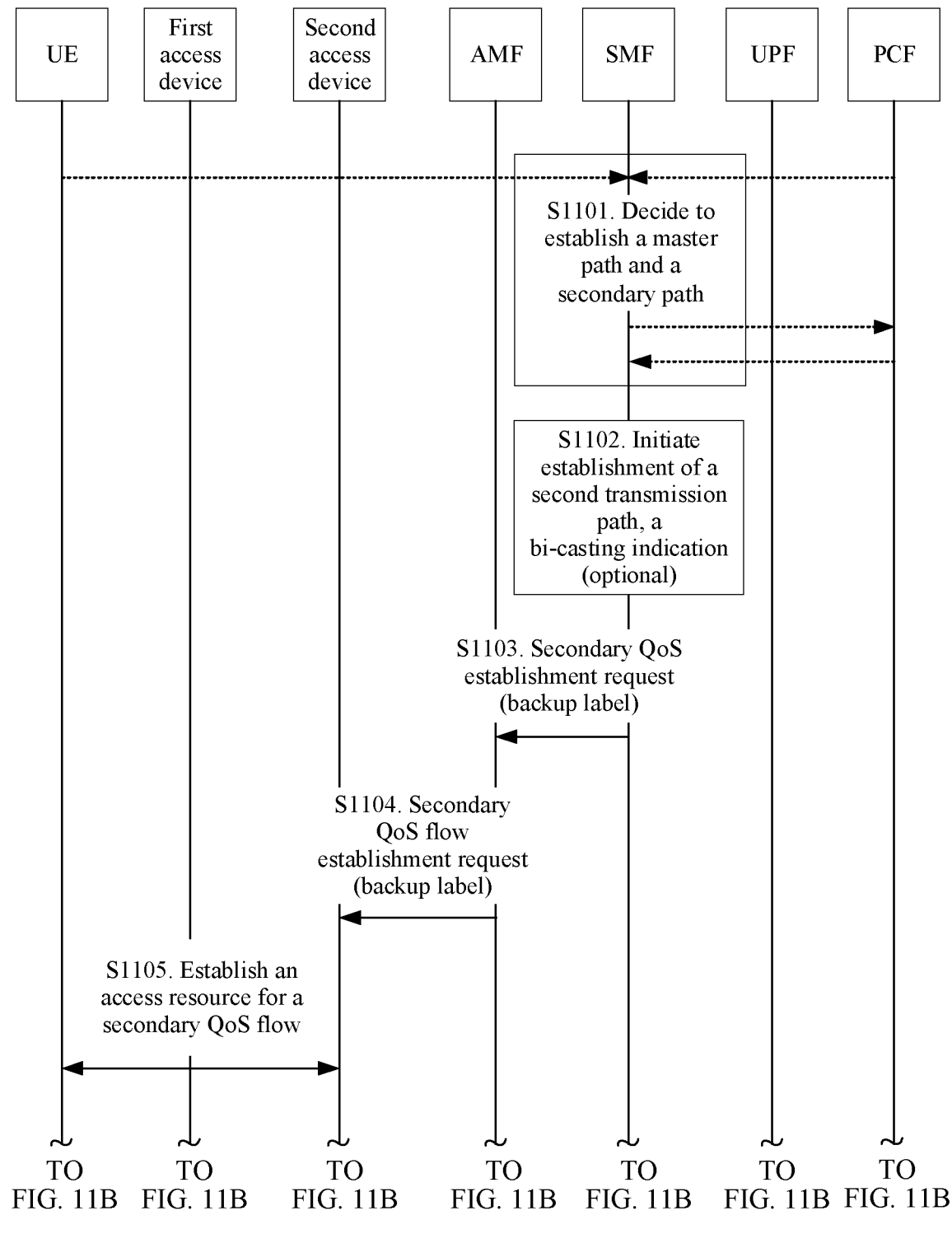
FIG. 11A and FIG. 11B are a signaling flowchart of a method 1100 for establishing a new transmission path in a 5G scenario according to an embodiment of the present disclosure.
Figure 11B:
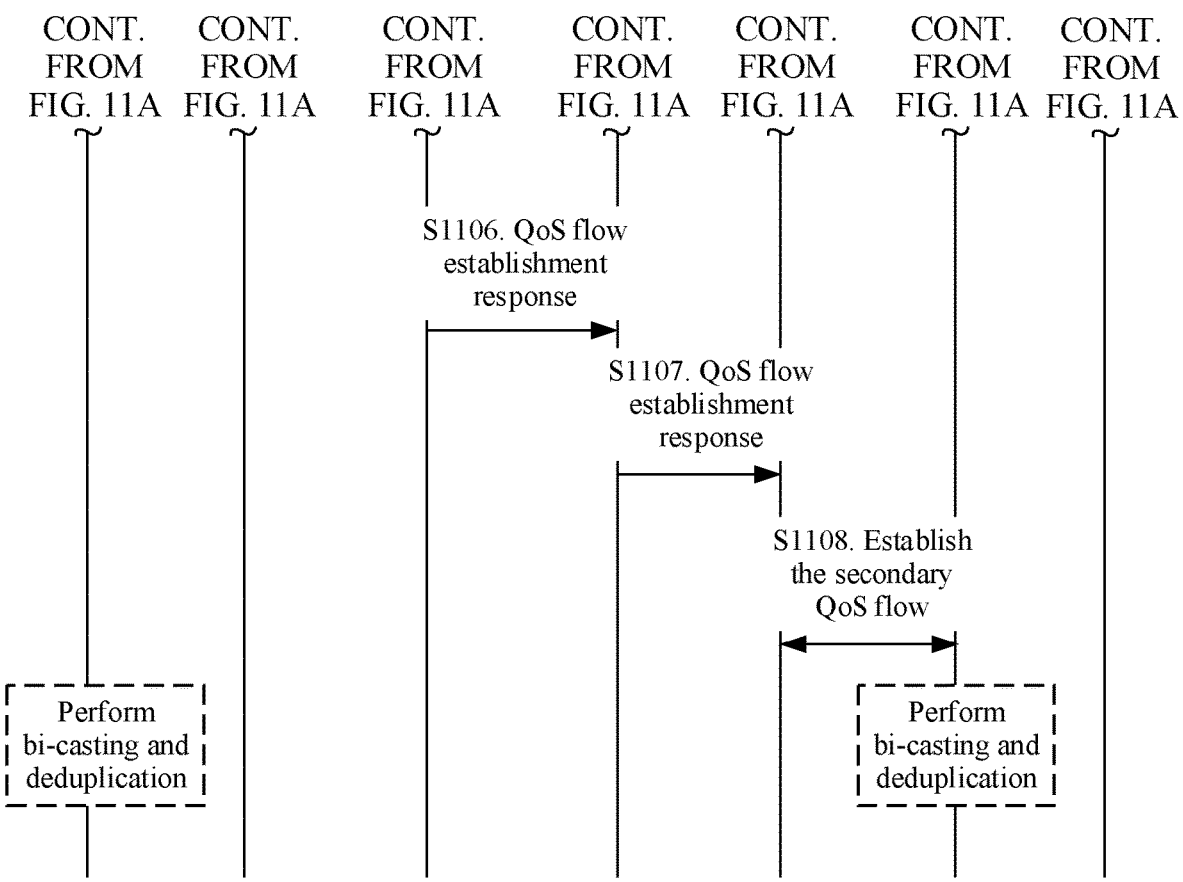

Referring to the architecture in FIG. 8A, FIG. 10A and FIG. 10B are a schematic flowchart of another embodiment 1000 of establishing a master path and a secondary path (namely, a first transmission path and a second transmission path) at an initial stage. In this embodiment, there is a communications interface between a first access device and a second access device, and UE may establish a same PDU session by using the first access device and the second access device. Control plane context of the UE is on the first access device. In other words, there is a signaling plane connection between an AMF and the first access device. The embodiment 1000 is described as follows.

S1001. Decide to establish the master transmission path and the secondary transmission path. For details, refer to step S901 in the foregoing embodiment.

S1002. An SMF initiates establishment of the master path and the secondary path. For details, refer to step S902 in the foregoing embodiment.

S1003. The SMF sends a master and secondary QoS flow establishment request to the AMF, where the request message carries QFIs of a first QoS flow and a second QoS flow, a PDU session ID (a master QoS flow and a secondary QoS flow are located in a same PDU session), TFTs, QoS, a backup label, a dual transmission indication (optional), and the like.

S1004. The AMF receives the master and secondary QoS flow establishment request sent by the SMF, and sends the master and secondary QoS flow establishment request to the first access device, where the request message carries the PDU session ID, the QFIs of the first QoS flow and the second QoS flow, a QoS rule, the backup label, the dual transmission indication (optional), and the like.

S1005. The first access device initiates a second access device addition procedure. (for example, a master base station initiates a secondary base station addition procedure, for details, refer to 3GPP standard TS 36.300)

The first access device sends a QoS establishment request message to the second access device, where the request message carries the QFI of the second QoS flow, information about a UPF side first tunnel, the PDU session ID, the QoS rule, and the like.

S1006. The second access device allocates radio resource information to the second QoS flow, and sends the allocated radio resource information to the first access device.

S1007. The first access device instructs the UE to establish the first QoS flow and the second QoS flow, where the notification message includes a first QoS flow identifier, a second QoS flow identifier, the PDU session ID, and the backup label. The UE establishes a master-secondary relationship between the first QoS flow and the second QoS flow based on these pieces of information, and completes associating the master path with the secondary path; dual transmission indication (optional), which instructs the UE to perform dual sending and dual receiving; radio resource information allocated by the first access device to the first QoS flow. Based on these pieces of radio resource information, the UE initiates a radio reconfiguration message to the first access device, to complete establishment of the first QoS flow; and radio resource information allocated by the second access device to the second QoS flow. Based on these pieces of radio resource information, the UE initiates a radio reconfiguration message to the second access device, to complete establishment of the second QoS flow.

S1008. The UE initiates the radio reconfiguration information to the first access device, to complete the establishment of the first QoS flow.

S1009. The UE initiates the radio reconfiguration information to the second access device, to complete the establishment of the second QoS flow.

S1010. The first access device sends a QoS flow establishment response message to the AMF, where the response message carries the QFIs of the first QoS flow and the second QoS flow, the PDU session ID, and the like.

S1011. The AMF sends a master and secondary QoS flow establishment response message to the SMF.

The message includes the first QoS flow identifier, the second QoS flow identifier, and the like.

S1012. The SMF instructs a UPF to establish UPF side user plane resources for the first QoS flow and the second QoS flow.

The SMF allocates resources (QoS and charging rules obtained by the SMF from elsewhere, and a tunnel) and sends the rules to the UPF. The UPF stores/installs the rules, to implement establishment of the user plane resources.

In addition, the SMF sends an N4 session modification message to the UPF. The message carries the following content.

a. The first QoS flow identifier, the second QoS flow identifier, and the backup label. Based on the backup label, the first QoS flow identifier (the QFI and the PDU session ID), and the second QoS flow identifier (the PDU session ID and the QFI), a UPF side completes binding the two QoS flows. In other words, the UPF side completes associating the master path with the secondary path.

b. Dual transmission indication (optional). Based on the indication, referring to FIG. 4 and FIG. 5, the UPF performs the following actions. b1. Downlink dual sending, when receiving a data packet that is sent by a DN and that is corresponding to the first QoS flow, the UPF replicates the data packet. The UPF sends the original data packet to the first access device through an N3 tunnel in which the first QoS flow is located, and sends a replicated data packet to the second access device through an N3 tunnel in which the second QoS flow is located. The UPF adds a dual transmission protocol header to each of the data packet corresponding to the first QoS flow and the data packet corresponding to the second QoS flow, where the protocol header carries a packet sequence number, an identifier, and the like. The UE may implement a deduplication operation by parsing the dual transmission protocol headers. b2. Uplink dual receiving, the UPF receives a data packet that is corresponding to the first QoS flow and that is sent by the first access device and a data packet that is corresponding to the second QoS flow and that is sent by the second access device, and deduplicates the data packets based on dual transmission protocol header information (which mainly includes sequence numbers, identifiers, and the like) in the data packets.

c. Other PCC rules. The UPF sets up policy and charging rules related to the second QoS flow, and the like.

The UPF sends an N4 session modification response message to the SMF and completes establishment of the UPF side user plane resources for the master QoS flow and the secondary QoS flow.

In this embodiment, the two access devices establish the two transmission paths through interaction, and a core network may send a master and secondary transmission path establishment request to only one access device, to establish the master transmission path and the secondary transmission path. For a same access technology, in an existing core network, only one access device is generally allowed to have a control plane connection with the AMF (for example, a master and secondary base station mechanism). In the solution in this embodiment, the network is slightly changed, and is more easily compatible with an existing network.

Based on the architectures in FIG. 8A and FIG. 8B, FIG. 11A and FIG. 11B show a procedure in which a core network initiates establishment of a second transmission path when there is already a first transmission path. Steps in an embodiment 1100 are described as follows.

S1101. Decide to establish the second transmission path. There may be the following cases.

a. UE sends a QoS improvement request or a link fault notification to an SMF, where includes a QoS parameter, a link fault notification, a secondary path establishment indication (optional), and the like. The SMF decides, based on a UE type (a URLLC terminal), a QoS improvement requirement, and the like and with reference to a network load status and a secondary path indication label (optional), to establish a secondary QoS flow for the request of the UE.

b. After receiving a QoS improvement request of UE or a link fault notification of UE, an SMF may further request authorization from a PCF, for example, send a secondary path establishment request to the PCF, where a request message carries a QoS parameter (such as a 5QI or a QoS requirement). The PCF decides, based on subscription information of the UE and the QoS parameter, to authorize the SMF to establish a secondary path for the UE, and the PCF sends a master and secondary path establishment response message to the SMF, where the message indicates that the SMF may establish a secondary QoS flow for the request of the UE.

c. A PCF sends a service request to an SMF, where the service request includes a QoS parameter and a backup label (Optionally, after receiving a service request of a DN, the PCF decides, based on subscription information of UE and the QoS parameter, that a master path and a secondary path need to be established for the service. In this case, the backup label may be carried). In addition, the PCF may further add a QFI, a PDU session ID, and the like that are of an original QoS flow to the service request. The SMF decides, based on a UE type (a URLLC terminal), a QoS requirement, and the like and with reference to a network load status, the backup label (optional), and an original QoS flow identifier, to establish a secondary QoS flow (or establishes a master path and a secondary path for the UE based on a master and secondary establishment indication of the PCF, and the backup label).

d. A UPF perceives that link quality deteriorates, for example, the link quality is lower than a preset value, and notifies an SMF, where the notification carries a PDU session ID, a QFI, and the like. The SMF decides, based on a UE type (a URLLC terminal), a QoS improvement requirement, and the like and with reference to a network load status and a secondary path indication label (optional), to establish a secondary QoS flow for the request of UE.

e. A UPF perceives that link quality deteriorates, and notifies an SMF. The SMF decides, based on a UE type (a URLLC terminal), a QoS improvement requirement, and the like and with reference to a network load status and a secondary path indication label (optional), that a secondary QoS flow needs to be established for the request of UE. The SMF sends a secondary path establishment request to a PCF, where a request message carries a QoS parameter (such as a 5QI or a QoS requirement). The PCF decides, based on subscription information of the UE and the QoS parameter, to authorize the SMF to establish a secondary path for the UE, and the PCF sends a master and secondary path establishment response message to the SMF, where the message indicates that the SMF may establish the secondary QoS flow for the request of the UE.

S1102. The SMF initiates establishment of the secondary path, where this step includes allocating, by the SMF, a user plane resource to the secondary QoS flow, and the user plane resource mainly includes QFIs of a master QoS flow and the secondary QoS flow, a packet detection rule and a charging rule, and the like. The allocation is as follows, allocating QoS flow-related resources (for example, PCC rules) such as the QFI corresponding to the secondary QoS flow. A charging policy or a QoS policy of the secondary QoS flow may be the same as or different from a charging policy or a QoS policy of a master QoS flow (for example, the secondary QoS flow may no longer be charged). This is not limited in this embodiment.

In this case, the SMF may further decide, based on a URLLC service type and/or a terminal type, whether to instruct the UPF and/or the UE to enable a dual transmission (dual sending and/or dual receiving) function.

The instruction includes the following steps. If the URLLC terminal is a high-speed mobile terminal (indicated by a QoS parameter, a service type, a terminal type, and the like), it indicates that instability of a network of the URLLC terminal is relatively high. A dual transmission indication notification is carried in a notification message for the establishment of the secondary path delivered by the SMF, to instruct the UPF and the UE to perform dual transmission. If the URLLC terminal is a low-speed mobile terminal, it indicates that a network path of the URLLC terminal is relatively stable. Only the secondary path may be established for the URLLC terminal, and dual transmission is enabled subsequently when needed.

S1103. The SMF sends a secondary QoS flow establishment request to an AMF, where the request message carries the QFIs of the master QoS flow and the secondary QoS flow, a PDU session ID (if the master QoS flow and the secondary QoS flow are located in different PDU sessions, two PDU session IDs need to be carried), TFTs, QoS, a backup label, a dual transmission indication (optional), and the like.

The backup label is used to indicate a relationship between the two QoS flows. The relationship between the two QoS flows may be referred to as a master-secondary relationship, an association (associated) relationship, or a binding relationship. The UE or the UPF may determine, based on the backup label, to transmit same data on each of the two QoS flows.

S1104. The AMF initiates a procedure of establishing secondary QoS, and sends a QoS flow establishment request message to a second access device, where the request message carries a QFI of a first QoS flow, a PDU session ID, a QFI of a second QoS flow, a PDU session ID (which may be different from or the same as the PDU session ID in which the first QoS flow is located, and this is not limited), the backup label, the dual transmission indication (optional), QoS, and the like.

S1105. The second access device receives the secondary QoS flow establishment request, maps a QoS rule to a radio QoS rule, and sends radio reconfiguration information to the UE, to complete establishment of the second QoS flow.

A UE side completes binding (or associating) the two QoS flows based on the backup label, a first QoS flow identifier (the QFI and the PDU session ID), and a second QoS flow identifier (the PDU session ID and the QFI). The second QoS flow that is to be established is bound with the first QoS flow that already exists, to complete associating the master path with the secondary path. Optionally, if the reconfiguration message includes the dual transmission indication, the UE enables dual transmission. For sample implementations, refer to FIG. 4 and FIG. 5. The implementations are as follows.

Uplink dual sending, the UE replicates a data packet, and replicates data corresponding to the first QoS flow to the UE. The UE sends an original data packet to a first access device by using a radio bearer corresponding to the first QoS flow, and sends a replicated data packet to the second access device by using a radio bearer in which the second QoS flow is located. The UE adds a dual transmission protocol header to each of the data packet corresponding to the first QoS flow and the data packet corresponding to the second QoS flow, where the protocol header carries a packet sequence number, an identifier, and the like. The UPF may implement a deduplication operation by parsing the dual transmission protocol headers.

Downlink dual receiving, the UE receives a data packet that is corresponding to the first QoS flow and that is sent by the first access device and a data packet that is corresponding to the second QoS flow and that is sent by the second access device, and deduplicates the data packets based on dual transmission protocol header information (which mainly includes sequence numbers, identifiers, and the like) in the data packets.

S1106. The second access device sends a QoS flow establishment response message to the AMF, to notify the AMF that the establishment of the second QoS flow on a wireless side is completed.

S1107. The AMF sends a master and secondary QoS flow establishment response message to the SMF.

The message includes the first QoS flow identifier, the second QoS flow identifier, and the like.

S1108. The SMF instructs the UPF to establish a UPF side user plane resource for the second QoS flow.

The SMF sends an N4 session modification message to the UPF. The message carries the following content, a. The first QoS flow identifier, the second QoS flow identifier, and the backup label. Based on the backup label, the first QoS flow identifier (the QFI and the PDU session ID), and the second QoS flow identifier (the PDU session ID and the QFI), a UPF side completes binding the two QoS flows. In other words, the UPF side completes associating the master path and the secondary path.

b. Dual transmission indication (optional). Based on the indication, referring to FIG. 4 and FIG. 5, the UPF performs the following actions. b1. Downlink dual sending, when receiving a data packet that is sent by a DN and that is corresponding to the first QoS flow, the UPF replicates the data packet. The UPF sends the original data packet to the first access device through an N3 tunnel in which the first QoS flow is located, and sends a replicated data packet to the second access device through an N3 tunnel in which the second QoS flow is located. The UPF adds a dual transmission protocol header to each of the data packet corresponding to the first QoS flow and the data packet corresponding to the second QoS flow, where the protocol header carries a packet sequence number, an identifier, and the like. The UE may implement a deduplication operation by parsing the dual transmission protocol headers. b2. Uplink dual receiving, the UPF receives a data packet that is corresponding to the first QoS flow and that is sent by the first access device and a data packet that is corresponding to the second QoS flow and that is sent by the second access device, and deduplicates the data packets based on dual transmission protocol header information (which mainly includes sequence numbers, identifiers, and the like) in the data packets.

c. Other PCC rules. The UPF sets up policy and charging rules related to the second QoS flow, and the like.

The UPF sends an N4 session modification response message to the SMF and completes establishment of the UPF side user plane resource for the secondary QoS flow.

In this embodiment, the core network initiates establishment of one new transmission path (the second transmission path), and there may be no interaction between the access devices that are responsible for bearing the two transmission paths. In this manner, 3GPP access devices can bear the two transmission paths respectively, or a 3GPP access device and a non-3GPP access device can bear the two transmission paths. It should be noted that, the first access device and the second access device may be a same access device (for example, a same base station) during implementation.

Figure 12A:
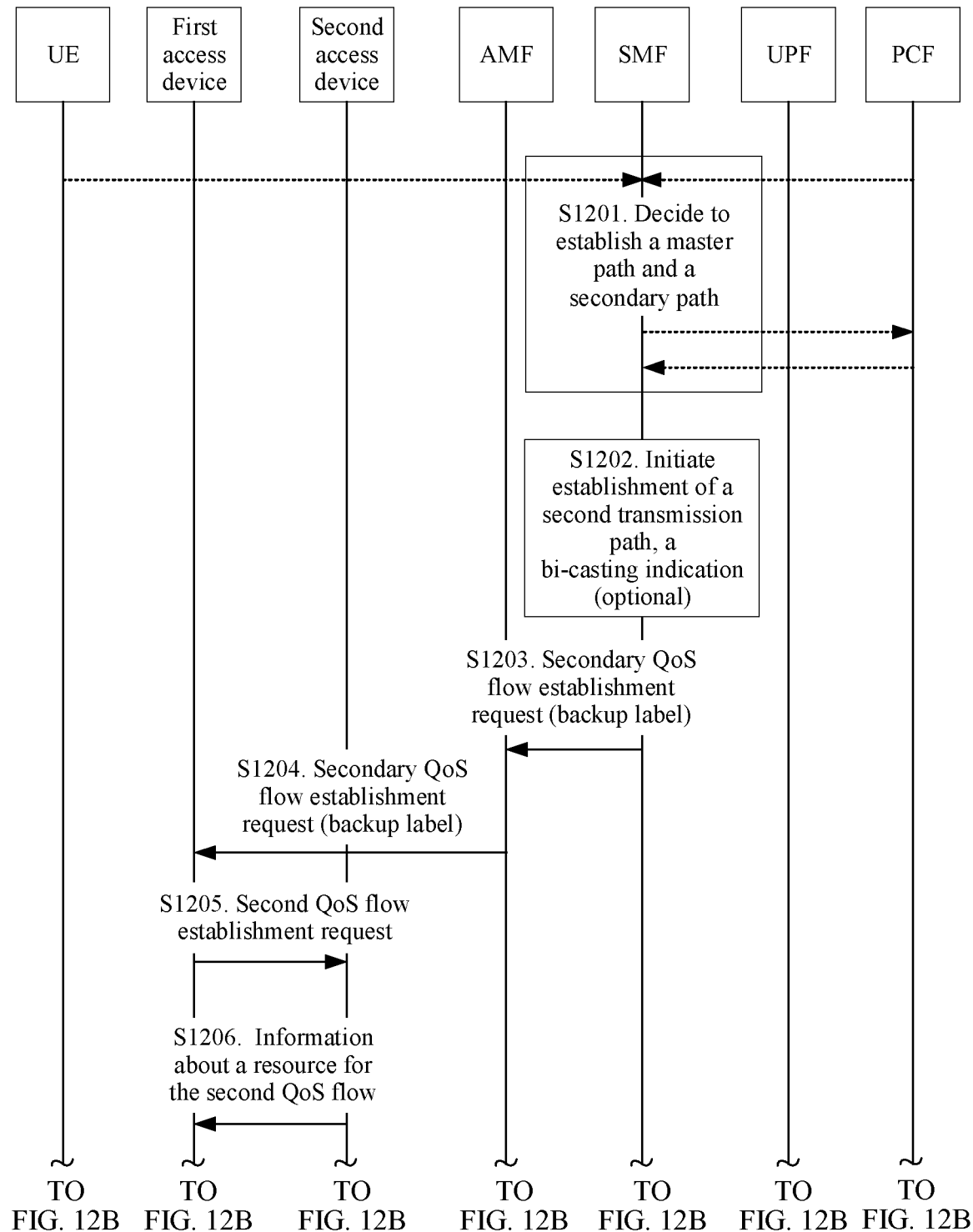
FIG. 12A and FIG. 12B are a signaling flowchart of a method 1200 for establishing a new transmission path in a 5G scenario according to an embodiment of the present disclosure.
Figure 12B:
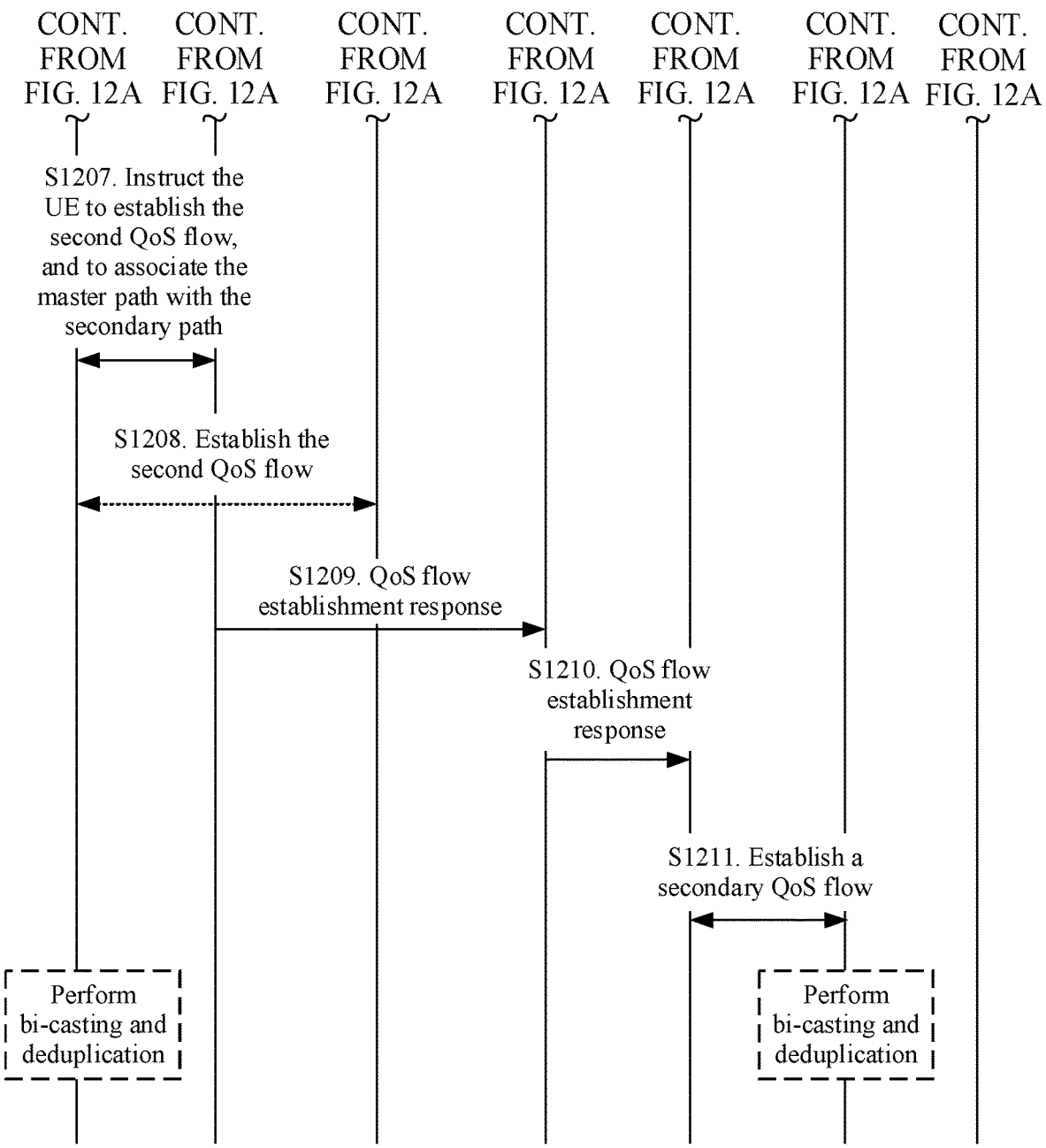

Based on the architecture in FIG. 8A, FIG. 12A and FIG. 12B show a procedure in which a core network initiates establishment of a second transmission path when there is already a first transmission path. Steps in an embodiment 1200 are described as follows.

S1201. Decide to establish a master transmission path and a secondary transmission path. For details, refer to step S1101 in the foregoing embodiment.

S1202. An SMF initiates establishment of the secondary path. For details, refer to step S1102 in the foregoing embodiment.

S1203. The SMF sends a second QoS flow establishment request to an AMF, where the request message carries, QFIs of a first QoS flow and a second QoS flow, a PDU session ID (a master QoS flow and a secondary QoS flow are located in a same PDU session), TFTs, QoS, a backup label, a dual transmission indication (optional), and the like.

S1204. The AMF receives the second (secondary) QoS flow establishment request sent by the SMF, and sends the secondary QoS flow establishment request to a first access device, where the request message carries the PDU session ID, the QFIs of the first QoS flow and the second QoS flow, a QoS rule, the backup label, the dual transmission indication (optional), and the like. The request message is used to instruct the first access device to establish the secondary QoS flow between a second access device and the UE.

S1205. The first access device initiates a second access device addition procedure. (For example, a master base station initiates a secondary base station addition procedure, for details, refer to 3GPP standard TS 36.300.)

The first access device sends a QoS establishment request message to the second access device, where the request message carries the QFI of the second QoS flow, the PDU session ID, the QoS rule, and the like.

S1206. The second access device allocates radio resource information to the second QoS flow, and sends the allocated radio resource information to the first access device.

S1207. The first access device instructs the UE to establish the second QoS flow, where the notification message includes, a first QoS flow identifier, a second QoS flow identifier, the PDU session ID, and the backup label. The UE establishes a master-secondary relationship between the first QoS flow and the second QoS flow based on these pieces of information, and completes associating the master path with the secondary path; dual transmission indication (optional), which instructs the UE to perform dual sending and dual receiving; and the radio resource information allocated by the second access device to the second QoS flow. Based on these pieces of radio resource information, the UE may complete establishment of the second QoS flow.

S1208. The UE initiates radio reconfiguration information to the second access device, to complete the establishment of the second QoS flow.

S1209. The first access device sends a QoS flow establishment response message to the AMF.

S1210. The AMF sends a master and secondary QoS flow establishment response message to the SMF.

S1211. The SMF instructs the UPF to establish a UPF side user plane resource for the second QoS flow.

The SMF allocates resources (QoS and charging rules obtained by the SMF from elsewhere, and a tunnel) and sends the rules to the UPF. The UPF stores/installs the rules, to implement establishment of the user plane resource.

In addition, the SMF sends an N4 session modification message to the UPF. The message carries the following content.

a. The first QoS flow identifier, the second QoS flow identifier, and the backup label. Based on the backup label, the first QoS flow identifier (the QFI and the PDU session ID), and the second QoS flow identifier (the PDU session ID and the QFI), a UPF side completes binding the two QoS flows. In other words, the UPF side completes associating the master path with the secondary path.

b. Dual transmission indication (optional). Based on the indication, referring to FIG. 4 and FIG. 5, the UPF performs the following actions. b1. Downlink dual sending, when receiving a data packet that is sent by a DN and that is corresponding to the first QoS flow, the UPF replicates the data packet. The UPF sends the original data packet to the first access device through an N3 tunnel in which the first QoS flow is located, and sends a replicated data packet to the second access device through an N3 tunnel in which the second QoS flow is located. The UPF adds a dual transmission protocol header to each of the data packet corresponding to the first QoS flow and the data packet corresponding to the second QoS flow, where the protocol header carries a packet sequence number, an identifier, and the like. The UE may implement a deduplication operation by parsing the dual transmission protocol headers. b2. Uplink dual receiving, the UPF receives a data packet that is corresponding to the first QoS flow and that is sent by the first access device and a data packet that is corresponding to the second QoS flow and that is sent by the second access device, and deduplicates the data packets based on dual transmission protocol header information (which mainly includes sequence numbers, identifiers, and the like) in the data packets.

c. Other PCC rules. The UPF sets up policy and charging rules related to the second QoS flow, and the like.

The UPF sends an N4 session modification response message to the SMF and completes establishment of UPF side user plane resources for the master QoS flow and the secondary QoS flow.

In this embodiment, the core network instructs, by using the first access device, the second access device and the UE to establish the second transmission path. For a same access technology, in an existing core network, only one access device is generally allowed to have a control plane connection with the AMF (for example, a master and secondary base station mechanism). In the solution in this embodiment, the network is slightly changed, and is more easily compatible with an existing network.

Figure 13:
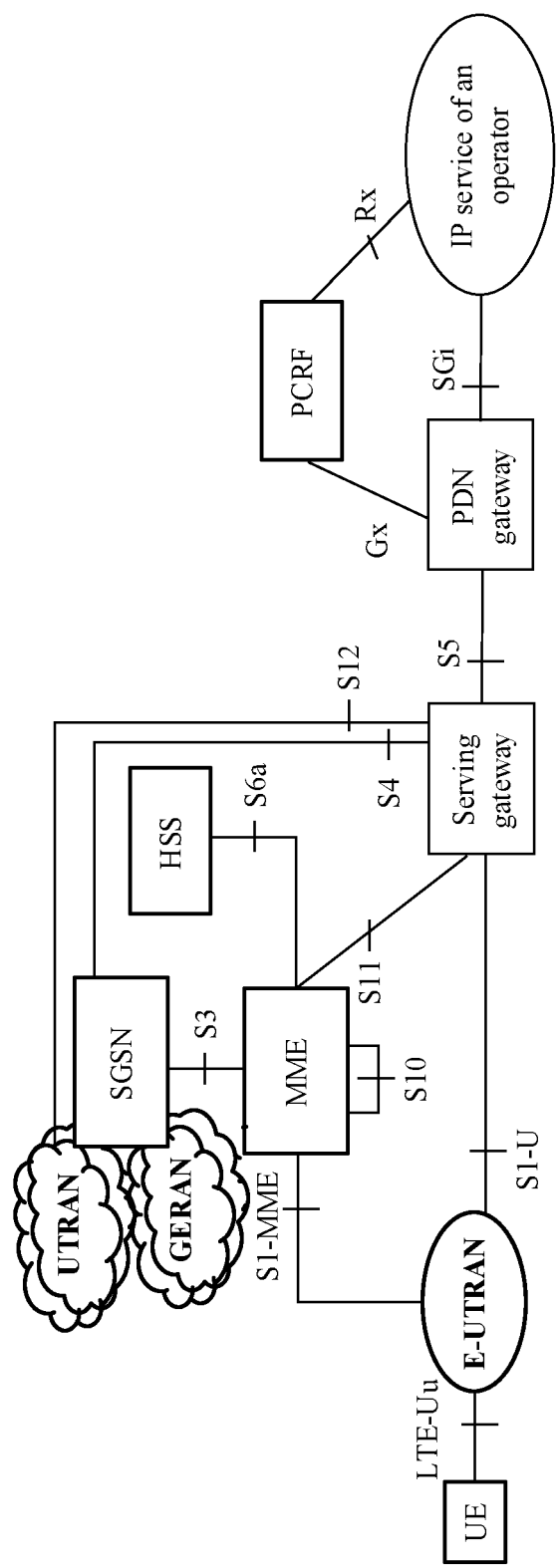
FIG. 13 is schematic architectural diagram of a 4G system according to an embodiment of the present disclosure.

The methods in the foregoing embodiments of the present disclosure may also be applied to a current 4G network. A possible applicable architecture is the architecture shown in FIG. 13. In FIG. 13, UE accesses a core network by using a 3GPP access device (an E-UTRAN). In 4G, the UE may alternatively access a network by using both a 3GPP access device and a non-3GPP access device, provided that there is a control plane connection between an MME and each of the access devices used by the UE to access the network. Table 2 shows names and function descriptions of network elements in FIG. 13 as follows.

TABLE 2

| Name of the network element | Function description |
| --- | --- |
| E-UTRAN (eNodeB) | A radio access network, an air interface part in 3GPP 4G, which usually refers to a radio base station |
| MME | A mobility management entity, responsible for mobility management on a control plane, user context and mobile status management, and the like |
| Serving Gataway (SGW) | A user anchor between different access networks of 3GPP, responsible for exchanging user plane data when a user moves between different access technologies |
| PDN Gateway | A PDN gateway, which is a user anchor between a 3GPP access network and a non-3GPP access network |

With reference to the procedures of the methods S900, S1000, S1100, and S1200 in the foregoing embodiments, when the present disclosure is implemented in a 4G network, a PGW network element performs a corresponding function of the SMF in the foregoing embodiments of the present disclosure; an MME network element performs a corresponding function of the AMF in the foregoing embodiments of the present disclosure; a PCRF performs a corresponding function of the PCF in the foregoing embodiments of the present disclosure; another related network element may also be implemented with reference to the foregoing embodiments, and details are not described herein.

A bearer is a minimum granularity for distinguishing QoS in 4G, and same forwarding processing, including a scheduling policy, queue management, traffic shaping, resource configuration, and the like, is performed on all service flows in one bearer. Different bearers need to be used to provide different QoS processing. Therefore, in 4G, one transmission path corresponds to one bearer.

The foregoing separately describes implementation of the solutions of the present disclosure in a 5G network architecture and a 4G network architecture. The terminal in all the foregoing embodiments may include various handheld devices, vehicle-mounted devices, wearable devices, computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, and the like.

The access device refers to a device that accesses a core network. For example, the access device may be a base station, a broadband network gateway (BNG), an aggregation switch, a non-3GPP access device, or the like. The base station may include base stations in various forms, such as a macro base station, a micro base station (also referred to as a small cell), a relay station, and an access point.

Actions related to the SMF entity and the PGW in all the foregoing embodiments may be performed by the processor 201 in the communications device 200 shown in FIG. 2 by invoking application program code stored in the memory 203. This is not limited in the embodiments of this application. Actions related to the terminal may also be performed by the processor 201 in the communications device 200 shown in FIG. 2 by invoking application program code stored in the memory 203. This is not limited in the embodiments of this application.

The solutions provided in the embodiments of this application are mainly described from a perspective of interaction between network elements. It may be understood that, to implement the foregoing functions, the session function entity or the terminal device includes a corresponding hardware structure and/or software module for implementing each function. A person skilled in the art should be easily aware that, in combination with units and algorithm steps in the examples described in the embodiments disclosed in this specification, this application can be implemented by hardware or a combination of hardware and computer software in this application. Whether a function is performed by hardware or hardware driven by computer software depends on particular applications and design constraints of the technical solutions. The person skilled in the art may use different methods to implement the described functions for each particular application, but it should not be considered that the implementation goes beyond the scope of this application.

In the embodiments of this application, the session function entity and the terminal device may be divided into function modules based on the foregoing method examples. For example, each function module may be obtained through division based on each function, or two or more functions may be integrated into one processing module. The integrated module may be implemented in a form of hardware, or may be implemented in a form of a software function module. It should be noted that, module division in the embodiments of this application is an example, and is merely logical function division. During actual implementation, another division manner may be used.

Figure 14:
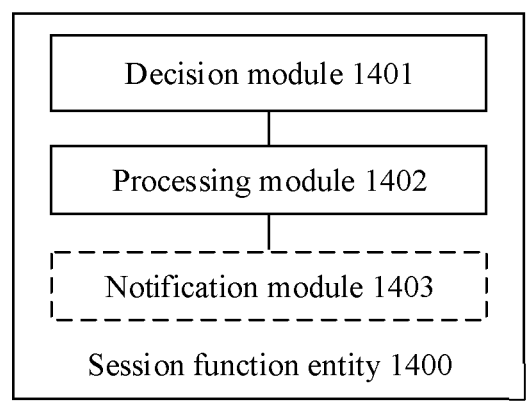
FIG. 14 is a schematic diagram of a session function entity 1400 according to an embodiment of the present disclosure.

For example, FIG. 14 is a schematic diagram of a possible structure of the session function entity 1400 in all the foregoing embodiments. The session function entity includes a decision module 1401 and a processing module 1402. The decision module 1401 is configured to determine to establish a first transmission path and a second transmission path that are between a terminal and a user plane function entity, or when there is already the first transmission path, determine to establish a second transmission path. The processing module 1402 is configured to initiate establishment of the first transmission path and the second transmission path, or when there is already the first transmission path, initiate establishment of the second transmission path. The processing module 1402 is further configured to instruct the terminal or the user plane function entity to transmit same data on the first transmission path and the second transmission path.

Optionally, the session function entity further includes a notification module 1403, and the notification module 1403 is configured to when the processing module 1402 initiates the establishment of the second transmission path, instruct the user plane function entity and/or the terminal to start to transmit the same data on the first transmission path and the second transmission path; or after the establishment of the second transmission path is completed, instruct, based on a request of the terminal or a request of a network side, the user plane function entity and/or the terminal to start to transmit the same data on the first transmission path and the second transmission path. For a dual transmission processing manner, refer to content in FIG. 4, FIG. 5, and the foregoing embodiments.

Optionally, the decision module 1401 obtains QoS information of a service based on a service request sent by the terminal or a policy function entity, and determines, based on the QoS information, that the first transmission path and the second transmission path that are between the terminal and the user plane function entity need to be established; or the decision module 1401 requests authorization from a policy function entity based on a master and secondary transmission path establishment indication or a bi-casting indication carried in a service request sent by the terminal, and determines, based on a result of the authorization, that the first transmission path and the second transmission path that are between the terminal and the user plane function entity need to be established.

Optionally, the decision module 1401 is configured to receive a request message sent by the terminal or a policy function entity, and determines, based on the request message, that the second transmission path between the terminal and the user plane function entity needs to be established; or the decision module 1401 receives a notification message that is about the first transmission path and that is sent by the user plane function entity, and determines, based on the notification message, that the second transmission path needs to be established. For example, the notification message may be a notification message indicating that the first transmission path is faulty.

Optionally, the processing module 1402 sends the first and second transmission path establishment request to a mobility management entity, and instructs the mobility management entity to instruct, based on the first and second transmission path establishment request, a first access device and a second access device to negotiate with the terminal to establish the first transmission path and the second transmission path respectively.

The session function entity may be an SMF or a PGW. All related content in all the foregoing embodiments may be cited in function descriptions of corresponding function modules, and details are not described herein.

Figure 15:
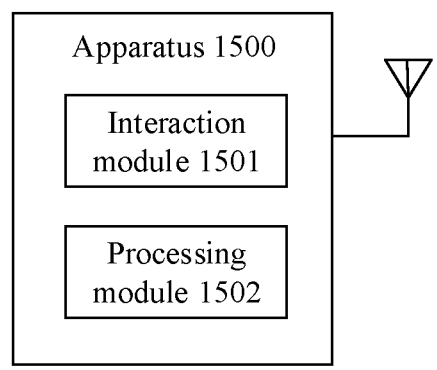
FIG. 15 is a schematic diagram of an apparatus 1500 according to an embodiment of the present disclosure.

FIG. 15 is a schematic diagram of a possible apparatus structure of the terminal in all the foregoing embodiments. The apparatus 1500 may be a terminal or a chip in a terminal. This is not specifically limited in this embodiment of this application. The apparatus 1500 includes an interaction module 1501 and a processing module 1502. The interaction module 1501 is configured to receive a message sent by a session function entity. The message instructs the terminal device to transmit same data on a first transmission path and a second transmission path that are between a user plane function entity and a terminal. The processing module 1502 is configured to transmit the same data on the first transmission path and the second transmission path.

Optionally, the interaction module 1501 is further configured to send a service request to the session function entity, where the service request carries an indication to establish at least two transmission paths or an indication to establish the second transmission path.

Optionally, the interaction module 1501 negotiates with a first access device and a second access device to establish the first transmission path and the second transmission path respectively.

Optionally, referring to FIG. 4, FIG. 5, and the foregoing embodiments, that the processing module 1502 transmits the same data on the first transmission path and the second transmission path includes the processing module 1502 sends the same data on the first transmission path and the second transmission path to the user plane function entity; or the processing module 1502 receives, on the first transmission path and the second transmission path, the same data sent by the user plane function entity, and deduplicates the received data; or the processing module 1502 selects one transmission path from the first transmission path and the second transmission path to receive the data.

Optionally, when the apparatus 1500 is a chip, a function/an implementation process of the interaction module 1501 may be implemented by using a pin, a circuit, or the like.

All related content in all the foregoing embodiments may be cited in function descriptions of corresponding function modules, and details are not described herein.

The session function entity 1400 and the apparatus 1500 provided in the embodiments of this application are configured to perform all the methods for improving service reliability. Therefore, for a technical effect that can be achieved by the session function entity 1400 and the apparatus 1500, refer to the foregoing method embodiments. Details are not described herein.

Although this application is described with reference to specific features and the embodiments thereof, various modifications and combinations may be made to this application without departing from the spirit and scope of this application. Correspondingly, the specification and accompanying drawings are merely example descriptions of this application defined by the accompanying claims, and are considered as any or all of modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for improving service reliability in a communications network, wherein the method comprises:
    transmitting, by a first access device, service data along a first transmission path between a terminal and a user plane function entity, wherein the first transmission path passes through the first access device;
    receiving, by the first access device, a message from a session function entity, wherein the message comprises a first identifier of the first transmission path, a second identifier of a second transmission path, and an association identifier, and wherein the association identifier indicates to transmit same service data on the first transmission path and the second transmission path; and
    initiating, by the first access device, establishment of the second transmission path through a second access device responsive to receiving the message.

2. The method of claim 1, wherein initiating the establishment of the second transmission path comprises initiating, by the first access device, a secondary base station addition process to establish the second transmission path on the second access device.

3. The method of claim 2, wherein the second transmission path is for a second quality of service (QoS) flow, and wherein initiating the secondary base station addition process comprises:
    sending, by the first access device, a QoS flow establishment request message to the second access device, wherein the QoS flow establishment request message instructs the second access device to establish the second transmission path; and receiving, by the first access device in response to the QoS flow establishment request message, allocated radio resource information for the second QoS flow from the second access device.

4. The method of claim 1, wherein the first access device is a 3rd Generation Partnership Project (3GPP) access device and the second access device is a non-3GPP access device, or wherein the first access device is the non-3GPP access device and the second access device is the 3GPP access device.

5. A first access device in a communications network, wherein the first access device comprises:
a processor; and
a memory configured to store computer-executable instructions, wherein the computer-executable instructions, when executed by the processor causes the processor to:
transmit service data along a first transmission path between a terminal and a user plane function entity, wherein the first transmission path passes through the first access device;
receive a message from a session function entity, wherein the message comprises a first identifier of the first transmission path, a second identifier of a second transmission path, and an association identifier, and wherein the association identifier indicates to transmit same service data on the first transmission path and the second transmission path; and
initiate establishment of the second transmission path through a second access device responsive to receiving the message.

6. The first access device of claim 5, wherein the computer-executable instructions further cause the processor to initiate a secondary base station addition process to establish the second transmission path on the second access device.

7. The first access device of claim 5, wherein the first access device is a 3rd Generation Partnership Project (3GPP) access device and the second access device is a non-3GPP access device, or wherein the first access device is the non-3GPP access device and the second access device is the 3GPP access device.

8. The first access device of claim 6, wherein the second transmission path is a second quality of service (QoS) flow, and wherein the computer-executable instructions further cause the processor to:
send a QoS flow establishment request message to the second access device; and
receive, in response to the QoS flow establishment request message, allocated radio resource information for the second QoS flow from the second access device.

9. A system comprising:
a first transmission path for transmitting service data between a terminal and a user plane function entity;
a session function entity configured to send a message in response to determining that a second transmission path needs to be established; and
a first access device along the first transmission path and configured to:
receive the message from the session function entity, wherein the message comprise a first identifier of the first transmission path, a second identifier of the second transmission path, and an association identifier, and wherein the association identifier indicates to transmit same service data on the first transmission path and the second transmission path; and
initiate establishment of the second transmission path through a second access device in response to receiving the message.

10. The system of claim 9, further comprising the second access device, wherein the first access device is further configured to initiate a secondary base station addition process to instruct the second access device to establish the second transmission path on the second access device.

11. The system of claim 10, wherein the second transmission path is for a second quality of service (QoS) flow and the first transmission path is for a first QoS flow, wherein the first access device is further configured to:
receive a first QoS flow establishment request message for the first QoS flow, wherein the first QoS flow establishment request includes at least a QoS rule;
map the QoS rule to a radio QoS rule;
send radio configuration to the terminal to complete establishment of the first QoS flow;
instruct the terminal to enable a dual transmission function;
send a second QoS flow establishment request message to the second access device; and
receive, in response to the second QoS flow establishment request message, allocated radio resource information for the second QoS flow from the second access device,
wherein the second access device is further configured to:
receive the second QoS flow establishment request message from the first access device; and
send, in response to the second QoS flow establishment request message, the allocated radio resource information to the first access device, and
wherein the session function entity is further configured such that after the first transmission path and the second transmission path are established, the session function entity instructs, based on a network status of the system or a service requirement of the terminal, the user plane function entity and/or the terminal to start to transmit same service data on the first transmission path and the second transmission path.

12. The system of claim 9, wherein the first access device is a 3rd Generation Partnership Project (3GPP) access device and the second access device is a non-3GPP access device, or wherein the first access device is the non-3GPP access device and the second access device is the 3GPP access device.

13. The system of claim 9, wherein the session function entity is further configured to determine that the second transmission path needs to be established in response to the session function entity receiving a secondary path establishment request directly from the terminal.

14. A method for improving service reliability in a communications network, wherein the method comprises:
transmitting, by a first access device, service data along a first transmission path between a terminal and a user plane function entity, wherein the first transmission path passes through the first access device;
sending, by a session function entity, a message in response to determining that a second transmission path needs to be established;
receiving, by the first access device, the message from the session function entity, wherein the message comprises a first identifier of the first transmission path, a second identifier of the second transmission path, and an association identifier, and wherein the association identifier indicates to transmit same service data on the first transmission path and the second transmission path; and initiation, by the first access device, establishment of the second transmission path through a second access device responsive to receiving the message.

15. The method of claim 14, wherein initiation the establishment of the second transmission path comprises initiating, by the first access device, a secondary base station addition process to establish the second transmission path on the second access device.

16. The method of claim 14, wherein the first access device is a 3rd Generation Partnership Project (3GPP) access device and the second access device is a non-3GPP access device, or wherein the first access device is the non-3GPP access device and the second access device is the 3GPP access device.

* * * * *